(12) United States Patent
Iwata et al.

(10) Patent No.: US 12,531,937 B2
(45) Date of Patent: Jan. 20, 2026

(54) COMMUNICATION APPARATUS, METHOD, AND PROGRAM

(71) Applicant: DENSO CORPORATION, Kariya (JP)

(72) Inventors: Naoki Iwata, Kariya (JP); Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 18/593,458

(22) Filed: Mar. 1, 2024

(65) Prior Publication Data

US 2024/0205310 A1 Jun. 20, 2024

Related U.S. Application Data

(63) Continuation of application No. PCT/JP2022/023914, filed on Jun. 15, 2022.

(30) Foreign Application Priority Data

Sep. 3, 2021 (JP) .................................. 2021-144318

(51) Int. Cl.
*H04L 69/22* (2022.01)
*H04L 49/901* (2022.01)
*H04L 49/9023* (2022.01)

(52) U.S. Cl.
CPC ............ *H04L 69/22* (2013.01); *H04L 49/901* (2013.01); *H04L 49/9023* (2022.05)

(58) Field of Classification Search
None
See application file for complete search history.

(56) References Cited

U.S. PATENT DOCUMENTS

| 2018/0035440 A1 | 2/2018 | Ohta et al. |
| 2019/0230676 A1 | 7/2019 | Ohta et al. |
| 2022/0394724 A1 | 12/2022 | Ohta et al. |

(Continued)

FOREIGN PATENT DOCUMENTS

| JP | 2011-188298 A | 9/2011 |
| JP | 2014-127790 A | 7/2014 |
| JP | 2018-152920 A | 9/2018 |

OTHER PUBLICATIONS

Kawashima, Yuki et al., Evaluation of Multiple Paths Distribution Method Based on Delay-jitter, IPSJ Transactions, vol. 48, No. 2, Feb. 2007, 38 pages.

*Primary Examiner* — June Sison
(74) *Attorney, Agent, or Firm* — Maschoff Brennan

(57) ABSTRACT

In a communication apparatus, a buffer offset calculator calculates a buffer offset for a transmission-ready state k-th communication unit in accordance with a total number of at least one of data packets that is (i) transmittable by at least one m-th communication unit in the N communication units except for the k-th communication unit and (ii) completely received by the recipient device within a data transmission period of the communication network corresponding to the k-th communication unit (m is each of variables 1 to N except for k). A data packet allocator selects, in a queue of the data packets stored in the transmission buffer, one of the data packets, a beginning of the selected data packet being located offset by the buffer offset relative to a beginning of the queue of the data packets. The data packet allocator allocates the selected data packet to the k-th communication unit.

16 Claims, 25 Drawing Sheets

(56) References Cited

U.S. PATENT DOCUMENTS

| | | | | |
|---|---|---|---|---|
| 2023/0026835 A1* | 1/2023 | Nakata | | H04W 28/10 |
| 2024/0396851 A1* | 11/2024 | Yoshinaga | | H04L 47/28 |
| 2025/0023827 A1* | 1/2025 | Nakata | | H04L 47/283 |

* cited by examiner

FIG.3

TRANSMISSION BUFFER 100

| P1 | P2 | P3 | P4 | P5 | P6 | P7 | P8 |

BUFFER OFFSET 4 t=t1 t=t2 t=t3 t=t4

COMMUNICATION APPARATUS, METHOD, AND PROGRAM

REFERENCE TO RELATED APPLICATIONS

This application is a bypass continuation application of currently pending international application No. PCT/JP2022/023914 filed on Jun. 15, 2022 designating the United States of America, the entire disclosure of which is incorporated herein by reference, the international application being based on and claiming the benefit of priority from Japanese Patent Application No. 2021-144318 filed on Sep. 3, 2021, the disclosure of which is incorporated in its entirety herein by reference.

TECHNICAL FIELD

The present disclosure relates to communication apparatuses, communication method, and communication programs, each of which performs communications concurrently using plural communication networks.

BACKGROUND

Users have recently considered concurrent communications in conjunction with plural communication networks, such as wireless LANs and/or wired communication networks, which aim to send high-volume data at high speed.

Japanese Patent Application Publication NO. 2018-152920, which will be referred to as a published patent document, discloses a wireless communication system that sends user data using plural wireless communication networks, such as first and second wireless communication networks simultaneously.

Yuki Kawashima, Hiroshi Mineo, Susumu Ishihara, and Tadanori Mizuno, "Evaluation of Multiple Paths Distribution Method Based on Delay-jitter", Journal of Information Processing Society of Japan, Vol. 48, No. 2, pp 880-891, February 2007, which will be referred to as a non-patent document, discloses a multiple-paths distribution method. The multiple-paths distribution method disperses packets to multiple paths based on communication-rate differences and communication-delay differences among the multiple paths to accordingly enable the packets to arrive at a target device in the right order. This avoids the occurrence of out-of-order packets.

SUMMARY

The disclosing persons of the present disclosure have discovered the following issues.

The technologies disclosed in the published patent document may be configured not to perform an aggregation process of using the plural communication networks simultaneously based on the communications delays of the respective communication networks. In particular, if the technologies disclosed in the published patent document are applied to vehicles, dynamic changes in communication environment may result in an increase in cases where the aggregation process is not carried out. This may result in no merit in using the plural communication networks.

The technologies disclosed in the non-patent document, which disperse packets to virtual transmission queues provided for the respective multiple paths, may therefore not respond to changes in communication environment after the dispersion, resulting in out-of-order packets.

From this viewpoint, the present disclosure seeks to provide, for example, communication apparatuses, each of which is capable of reducing a possibility of out-of-order packets at a recipient device.

Preferably, the present disclosure seeks to provide such communication apparatuses, each of which is comprised of plural communication units and is capable of reducing the computation load required to allocate data packets to the plural communication units.

A communication apparatus according to a first aspect of the present disclosure for transmitting, to a recipient device, fixed-length data packets with use of N communication networks (N is an integer more than or equal to 2) includes a transmission buffer configured to store the data packets in an intended order of complete receipt of the data packets in the recipient device. The communication apparatus includes N communication units provided for the corresponding respective N communication networks and configured to transmit at least one of the data packets. The communication apparatus includes a communication controller configured to retrieve, from the transmission buffer, the data packets, and allocate the data packets to a selected at least one of the N communication units.

The communication controller includes a data transmission period acquiring unit configured to acquire, for each communication network, a data transmission period required from transmission of one of the data packets through the corresponding network to complete receipt of the one of the data packets by the recipient device. The communication controller includes a transmission ready determiner configured to determine whether a transmission waiting state of each communication unit has changed to a transmission-ready state that enables data-packet transmission. The communication controller includes a buffer offset calculator configured to calculate, in response to determination that a k-th communication unit included in the N communication units is in the transmission-ready state, a buffer offset for the k-th communication unit in accordance with a total number of at least one of the data packets that is (i) transmittable by at least one m-th communication unit in the N communication units except for the k-th communication unit and (ii) completely received by the recipient device within the data transmission period of the communication network corresponding to the k-th communication unit (m is each of variables 1 to N except for k). The communication controller includes a data packet allocator configured to select, in a queue of the data packets stored in the transmission buffer, one of the data packets, a beginning of the selected data packet being located offset by the buffer offset relative to a beginning of the queue of the data packets, and allocate the selected data packet to the k-th communication unit.

A communication apparatus according to a second aspect of the present disclosure for transmitting, to a recipient device, fixed-length data packets with use of N communication networks (N is an integer more than or equal to 2) includes a transmission buffer configured to store the data packets in an intended order of complete receipt of the data packets in the recipient device. The communication apparatus includes N communication units provided for the corresponding respective N communication networks and configured to transmit at least one of the data packets. The communication apparatus includes communication controller configured to retrieve, from the transmission buffer, the data packets, and allocate the data packets to a selected at least one of the N communication units. The communication controller includes a data transmission period acquiring unit configured to acquire, for each communication network, a data transmission period required from transmission of one of the data packets through the corresponding network to complete receipt of the one of the data packets by the recipient device. The communication controller includes a sort unit configured to sort a list of the communication units in ascending order of communication-rate of the communication networks respectively corresponding to the N communication units, so that the list of the N communication units is sorted from the first communication unit to the N-th communication unit in ascending order of their communication rates. The communication controller includes a transmission ready determiner configured to determine whether a transmission waiting state of each communication unit has changed to a transmission-ready state that enables data-packet transmission. The communication controller includes a buffer offset calculator configured to calculate, in response to determination that a k-th communication unit included in the N communication units is in the transmission-ready state, a buffer offset for the k-th communication unit in accordance with a total number of at least one of the data packets that is (i) transmittable by at least one m-th communication unit in the N communication units and (ii) completely received by the recipient device within the data transmission period of the communication network corresponding to the k-th communication unit (m is each of variables 1 to k−1). The data transmission period of the at least one m-th communication unit is smaller than that of the k-th communication unit. The communication controller includes a data packet allocator configured to select, in a queue of the data packets stored in the transmission buffer, one of the data packets, a beginning of the selected data packet being located offset by the buffer offset relative to a beginning of the queue of the data packets, and allocate the selected data packet to the k-th communication unit.

A communication method according to a third aspect of the present disclosure is executable by a communication apparatus of transmitting, to a recipient device, fixed-length data packets with use of N communication networks (N is an integer more than or equal to 2). The communication method includes storing the data packets in an intended order of complete receipt of the data packets in the recipient device, acquiring, for each communication network, a data transmission period required from transmission of one of the data packets through the corresponding network to complete receipt of the one of the data packets by the recipient device, and determining whether a transmission waiting state of each communication unit has changed to a transmission-ready state that enables data-packet transmission. The communication method includes calculating, in response to determination that a k-th communication unit included in the N communication units is in the transmission-ready state, a buffer offset for the k-th communication unit in accordance with a total number of at least one of the data packets that is (i) transmittable by at least one m-th communication unit in the N communication units except for the k-th communication unit and (ii) completely received by the recipient device within the data transmission period of the communication network corresponding to the k-th communication unit (m is each of variables 1 to N except for k). The communication method includes selecting, in a queue of the data packets stored in the transmission buffer, one of the data packets, a beginning of the selected data packet being located offset by the buffer offset relative to a beginning of the queue of the data packets, and allocating the selected data packet to the k-th communication unit. The communication method includes transmitting, by the k-th communication unit, the allocated data packet to the recipient device.

A non-transitory storage media according to a fourth aspect of the present disclosure stores a communication program executable by a communication apparatus for transmitting, to a recipient device, fixed-length data packets with use of N communication networks (N is an integer more than or equal to 2). The communication program causes the control apparatus to (I) Store the data packets in an intended order of complete receipt of the data packets in the recipient device (II) Acquire, for each communication network, a data transmission period required from transmission of one of the data packets through the corresponding network to complete receipt of the one of the data packets by the recipient device (III) Determine whether a transmission waiting state of each communication unit has changed to a transmission-ready state that enables data-packet transmission (IV) Calculate, in response to determination that a k-th communication unit included in the N communication units is in the transmission-ready state, a buffer offset for the k-th communication unit in accordance with a total number of at least one of the data packets that is (i) transmittable by at least one m-th communication unit in the N communication units except for the k-th communication unit and (ii) completely received by the recipient device within the data transmission period of the communication network corresponding to the k-th communication unit (m is each of variables 1 to N except for k)

(V) Select, in a queue of the data packets stored in the transmission buffer, one of the data packets, a beginning of the selected data packet being located offset by the buffer offset relative to a beginning of the queue of the data packets (VI) Allocate the selected data packet to the k-th communication unit (VII) Instruct the k-th communication unit to transmit the allocated data packet to the recipient device

BRIEF DESCRIPTION OF THE DRAWINGS

The above object, other objects, characteristics, and advantageous benefits of the present disclosure will become apparent from the following description with reference to the accompanying drawings in which:

FIG. 3 is a diagram illustrating data packets stored in a transmission buffer;

DETAILED DESCRIPTION OF THE EMBODIMENTS

The following describes embodiments of the present disclosure with reference to accompanying drawings.

The subject matter described hereinafter means inventions described in the CLAIMS, and is not limited to the following embodiments. A word or a phrase in double quotation marks means a word or a phrase described in the CLAIMS, and is not limited to the meaning of a corresponding word or a corresponding phrase used in the following embodiments.

Structures and methods described in dependent claims in the CLAIMS means any structures and any methods in one or more independent claims in the CLAIMS. Structures and methods described in the DETAILED DESCRIPTION OF THE EMBODIMENTS, which correspond to the structures and methods described in the dependent claims, mean any structures and any methods in the subject matter. Structures and methods described in only the DETAILED DESCRIPTION OF THE EMBODIMENTS, which are not described in the CLAIMS, mean any structures and any methods in the subject matter. Even if the scope of the CLAIMS is wider than the descriptions in the DETAILED DESCRIPTION OF THE EMBODIMENTS, the structures and methods described in the DETAILED DESCRIPTION OF THE EMBODIMENTS mean any structures and any methods, which are examples of all the structures and all the methods within the subject matter. Any structure described in at least one independent claim in the CLAIMS represents an essential structure in the subject matter, and any method described in at least one independent claim in the CLAIMS represents an essential method in the subject matter.

Effects described in the DETAILED DESCRIPTION OF THE EMBODIMENTS mean effects achieved by at least one of the structures described as an example in the DETAILED DESCRIPTION OF THE EMBODIMENTS, and therefore, the effects described in the DETAILED DESCRIPTION OF THE EMBODIMENTS do not necessarily mean advantageous benefits achieved by the subject matter.

Structures disclosed in any embodiment are not limited in the corresponding embodiment, but can be combined with any structures disclosed in the other embodiments. For example, a structure disclosed in one embodiment can be combined with a structure disclosed in another embodiment. One or more structures extracted in all the embodiments can be collectively combined with one another.

One or more issues described in the present disclosure are not known issues, and they have been found uniquely by the inventors. The one or more issues described in the present disclosure are therefore factors that affirm the non-obviousness of the subject matter together with the structures and methods described in the present disclosure.

Common Structure Among Embodiments

First, the following describes a common structure among the embodiments.

Figure 1:
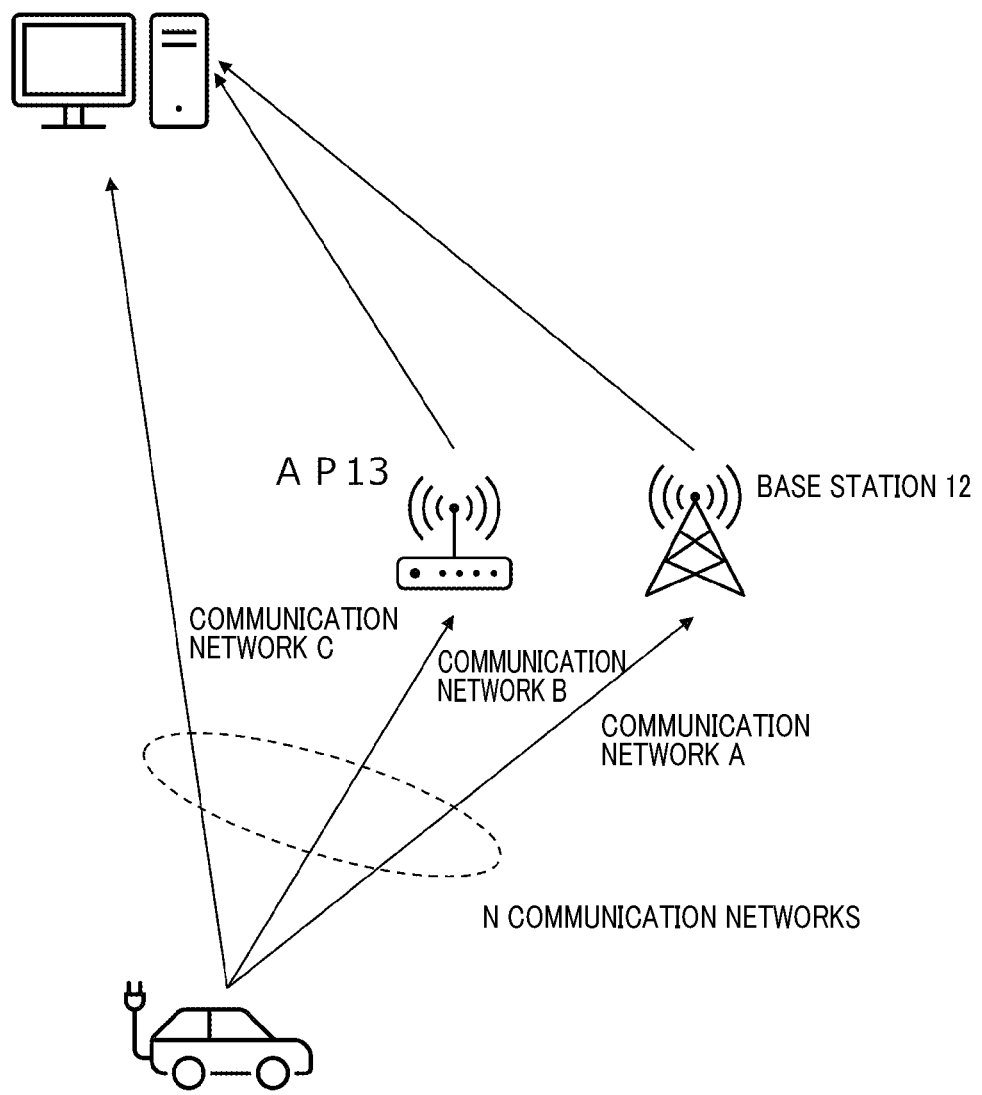
FIG. 1 is a diagram illustrating communication units and communication networks that represent a common structure between the first and second embodiments.

Each communication apparatus 10, 20 is configured to transmit, to a recipient device 11, data packets concurrently using N communication networks. FIG. 1 illustrates an example where N is set to 3.

The three communication networks are a communication network A, a communication network B, and a communication network C.

The communication network A is established based on a mobile communication system. As the communication network A, for example, one of various wireless communication standards, such as Wideband Code Division Multiple Access (W-CDMA), High Speed Packet Access (HSPA), Long Term Evolution (LTE), Long Term Evolution Advanced (LTE-A), 4G, or 5G, can be used.

Each communication apparatus 10, 20 can be linked to a base station 12 through the communication network A.

The communication network B has the maximum communication distance shorter than that of the communication device A. As the communication network B, for example, one of various wireless communication standards, such as IEEE 802.11 (Wi-Fi®), IEEE 802.16 (WiMAX®), Bluetooth®, Ultra Wide Band (UWB), or Dedicated Short-Range Communication (DSRC) can be used.

Each communication apparatus 10, 20 can be linked to an access point (AP) 13 through the communication network B.

The communication network C is a cable communication network. As the communication network C, for example, one of various cable communication networks can be used; the various cable networks can include a local area network (LAN), such as Ethernet®, an optical network, and a fixed phone line.

Each communication apparatus 10, 20 can be linked to unillustrated routers through the communication network C.

The communication networks A to C are an example of the N communication networks. Each communication apparatus 10, 20 can be configured to use only wireless communication networks, such as a combination of long-distance and short-distance communication networks, or a combination of long-distance communication networks. In particular, each communication apparatus 10, 20 can be configured to use a combination of long-distance communication networks with the same wireless communication standard, which are provided by plural carriers. The number of communication networks that can be used by each communication apparatus 10, 20 can be freely set to two or more.

FIG. 1 illustrates an example where each communication apparatus 10, 20 is installed in a motor vehicle as a "mobile object", but the present disclosure is not limited to the precondition that each communication apparatus 10, 20 is installed in a mobile object. For example, each communication apparatus 10, 20 can be installed in a building. If each communication apparatus 10, 20 is installed in a traveling motor vehicle, the communication apparatus 10 (20) does not perform cable-communications with exterior devices. However, each communication apparatus 10, 20 can perform wired communications using the communication network C when the motor vehicle is parked at a parking space or another parking space or is placed in a garage.

A "mobile object" is a movable object that is moving at any moving speed or is stopped. A motor vehicle, a motorcycle, a bicycle, a pedestrian, a ship, or an aircraft can be used as a "mobile object". Any object installed in one of a motor vehicle, a motorcycle, a bicycle, a pedestrian, a ship, or an aircraft can also be used as a "mobile object".

The feature that each communication apparatus 10, 20 is "installed" in a mobile object can include a case where the communication apparatus 10, 20 is directly mounted to the mobile object, and a case where the communication apparatus 10, 20 is not directly mounted to the mobile object and can be movable with the mobile object. The feature that each communication apparatus 10, 20 is "installed" in a mobile object can additionally include a case where a person who is in a mobile object carries the communication apparatus 10, 20, and a case where the communication apparatus 10, 20 is installed in a cargo installed in a mobile object.

Data packets to be transmitted to the recipient device 11 are each a "fixed-length data packet". Using fixed-length data packets enables the order of arrival of the fixed-length data packets at the recipient device 11 to be easily predicted. For example, if TCP segments are used as data packets, the TCP segments, i.e., TCP packets, have 1460 bytes as the maximum size thereof.

"Fixed-length data packets" can include data packets each having a fixed-length. Additionally, if each communication apparatus 10, 20 transmits a variable-length data packet having a predetermined maximum length, the variable-length data packet having the predetermined maximum length can be assumed as a fixed-length data packet. If each communication apparatus 10, 20 transmits a batch of variable-length data packets as a fixed-data packet batch, the batch of variable-length data packets can be assumed as a fixed-length data packet.

A variable-length data packet can be divided into plural data packets each having a predetermined fixed length, i.e., a fixed size. Variable data packets, each of which has a length shorter than a predetermined maximum length, can be assumed as fixed-length data packets as long as null data has been added to each variable data packet so that the corresponding variable data packet has the predetermined maximum size.

Each data packet can include a set of lower-level data items, such as subframes and sub-blocks. A fixed-data packet can be designated by any name, such as a frame, a subframe, or a sub-block.

First Embodiment

Configuration of Communication Apparatus 10

The following describes an example of the configuration of the communication apparatus 10 according to the first embodiment with reference to FIGS. 2 to 6.

The communication apparatus 10 includes a transmission buffer 100, a communication section 110, and a communication controller 120.

The communication apparatus 10 can be comprised of, for example, one or more general-purpose central processing units (CPUs), one or more volatile memories, such as RAMs, one or more non-volatile memories, such as ROMs, flash memories, and hard disks, various interfaces, and one or more internal buses that communicably connect the above hardware components with one another. The one or more CPUs execute software to accordingly implement the functional blocks disclosed in FIG. 2. One or more specific ICs, such as LSIs, can implement the communication apparatus 10.

The communication apparatus 10 of each embodiment is comprised of, for example, an electronic control unit (ECU) configured as a semi-finished product. The communication apparatus 10 of each embodiment can be comprised of (i) a component, such as a semiconductor circuit and/or a semiconductor module, (ii) a semi-finished product, such as an electronic control unit (ECU) and/or a system board, or (iii) a finished product, such as a server, a workstation, a personal computer (PC), a tablet, a smartphone, a cellular phone, or a navigation system. The communication apparatus 10 of each embodiment can be comprised of a single ECU or a plurality of ECUs.

Transmission Buffer 100 and Data Packet to be Stored in Transmission Buffer 100

The transmission buffer 100 is configured to store data packets to be transmitted to the recipient device 11. The transmission buffer 100 of the first embodiment stores data packets in an intended order or a scheduled order of complete receipt of the data packets in the recipient device 11.

The phrase "complete receipt of a data packet" can mean (i) a completion of receipt of the data packet by the recipient device 11, (ii) a completion of transmission of a safe receipt for the data packet(s) from the recipient device 11 after the data packet being received by the recipient device 11, or (iii) a completion of receipt of the safe receipt of the data packet.

The sentence "the transmission buffer 100 stores data packets in an intended order" can mean that the transmission buffer 100 respectively stores the data packets in selected addresses thereof in the intended order; the selected addresses are arranged in descending order or ascending order. The sentence "the transmission buffer 100 stores data packets in an intended order" can also mean that the transmission buffer 100 stores the transmission buffer 100 to be distinguishable from each other independently of the addresses of the transmission buffer 100.

FIG. 3 illustrates an example of data packets P1 to P8 to be stored in the transmission buffer 100.

Each of the data packets P1 to P8 constitutes a video-data packet. If the data packets P1 to P8 are configured such that playing the data packets P1 to P8 in this order constitutes a series of videos, it is preferable that the data packets P1 to P8 should be completely received by the recipient device 11 in the order from the data packet P1 to the data packet P8.

In this case, the data packets P1 to P8 are stored in the transmission buffer 100 in the intended order of complete receipt of the data packets P1 to P8, i.e., in the order from the data packet P1 to the data packet P8. For example, the data packets P1 to P8 are stored in selected addresses thereof in the intended order; the selected addresses are arranged in descending order.

The data packets can be stored in the transmission buffer 100 freely from the addresses of the transmission buffer 100 as long as the intended order of complete receipt of the data packets in the recipient device 11 can be recognized by the communication apparatus 10. In this case, each of the data packets is comprised of a header, and a serial number indicative of the playback order among the data packets can be stored in the header of the corresponding one of the data packets. This enables the communication apparatus 10 to read the header of each data packet, making it possible for the communication apparatus 10 to recognize the reconstructed order of the corresponding data packet.

The transmission buffer 100 can be simply comprised of a readable and writable storage medium, such as one or more RAMs, one or more various semiconductor memories, or one or more hard disks.

Communication Section 110

The communication section 110 is comprised of two or more communication units, i.e., N communication units, provided for respective communication networks; each of the communication units is configured to transmit data packets. Specifically, the communication module 110 of the first embodiment is comprised of three communication units provided for three communication networks included in the N communication networks; the three communication units are first, second, and third communication units 111, 112, and 113. Hereinafter, when comprehensively expressing the first to third communication units 111, 112, and 113, the following uses the communication section 110, and when individually expressing the first to third communication units 111, 112, and 113, the following uses the first to third communication units 111, 112, and 113.

The communication networks connected to the respective first to third communication units 111 to 113 according to the first embodiment are each a wireless communication network. Each of the communication networks has a predetermined communication rate, and the communication rate of the communication network connected to the second communication unit 112 is the fastest in all the communication networks, and the communication rate of the communication network connected to the third communication unit 113 is the slowest in all the 20) communication networks.

The communication section 110 can be comprised of plural communication modules, various interfaces, and one or more internal buses.

Communication Controller 120

The communication controller 120 is configured to sequentially retrieve, from the transfer buffer 200, one of the data packets, and sequentially allocate the retrieved data packet to a selected at least one of the first, second, and third communication units 111, 112, and 113. This allocation enables the recipient device 11 to receive the data packets in the intended order.

In particular, the first embodiment is specifically configured to control how and when the communication controller 120 allocates each of the data packets to a selected at least one of the first, second, and third communication units 111, 112, and 113.

The following specifically describes an example of the configuration of the communication controller 120, and how and when the communication controller 120 allocates each of the data packets to a selected at least one of the first, second, and third communication units 111, 112, and 113.

The communication controller 120 includes a data transmission period acquiring unit 121, a transmission ready determiner 122, and a data packet selector 123. The data packet selector 123 includes a buffer offset calculator 1231 and a data packet allocator 1232. The one or more CPUs of the communication apparatus 10 execute one or more programs stored in at least one of the ROMs to accordingly implement the functional blocks 121, 122, and 123 (1231, 1232) of the communication controller 120.

The following provides the detailed descriptions of the communication controller 120.

Data Transmission Period Acquiring Unit 121 and Data Transmission Time

Because the communication networks have respectively different communication rates, even if the same-sized data packets are transmitted through the respective communication networks, the data transmission times of the same-sized data packets are different from one another among the respective communication networks.

From this viewpoint, when transmitting a fixed-length data packet, the data transmission period acquiring unit 121 acquires a time required for transmission of the data packet through each of the communication networks. Specifically, the data transmission period acquiring unit 121 of the first embodiment acquires, for each communication network, a data transmission period for a data packet, which is a period required from transmission of the data packet through the corresponding communication network to the "complete receipt" of the data packet by the recipient device 11.

The phrase "complete receipt of a data packet" can mean (i) a completion of receipt of the data packet by the recipient device 11, (ii) a completion of transmission of safe receipt for the data packet from the recipient device 11 after the data packet being received by the recipient device 11, or (iii) a completion of receipt of safe receipt of the data packet.

Figure 4:
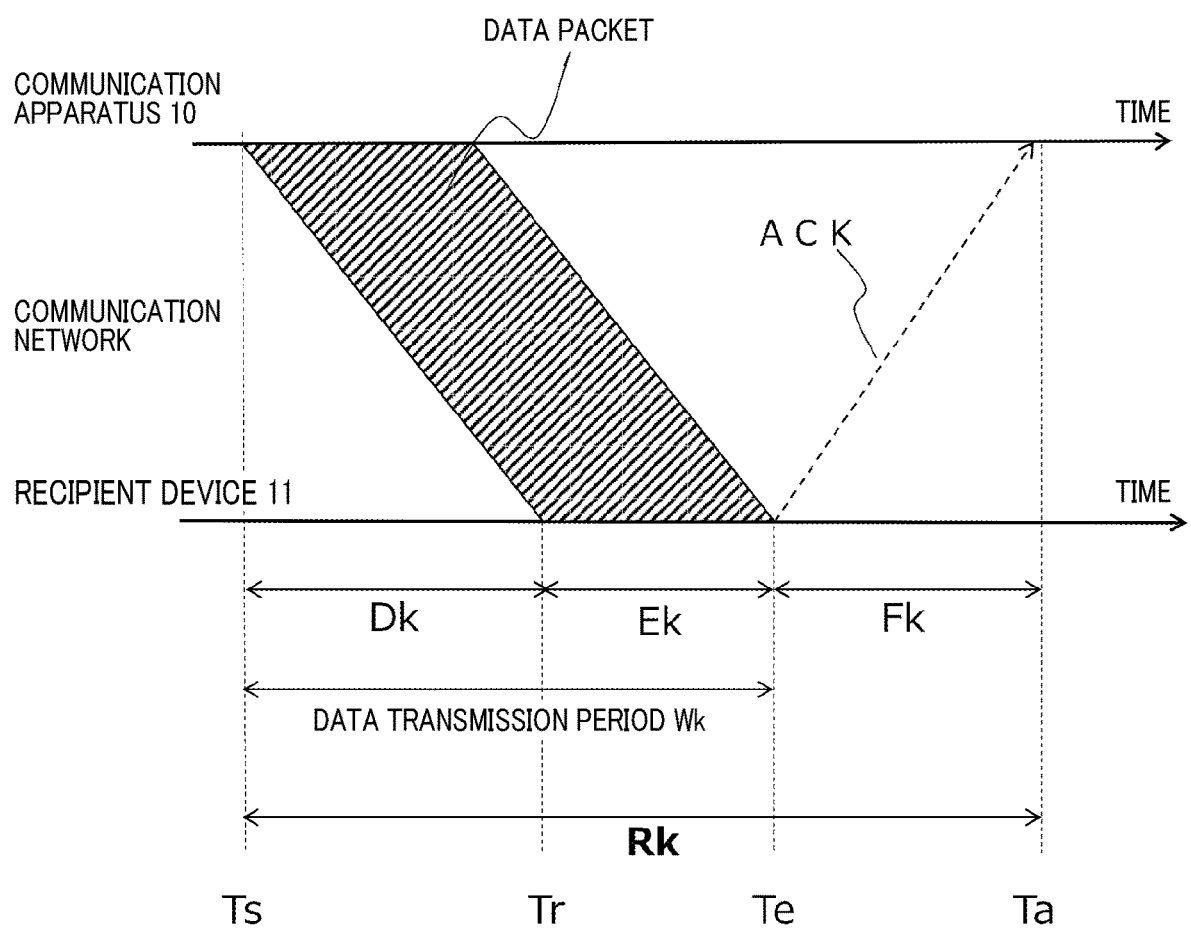
FIG. 4 is a diagram illustrating a data transmission period acquired by a data transmission period.

FIG. 4 is a diagram illustrating how a fixed-length data packet is changed over time between (i) transmission of the fixed-length data packet from the communication apparatus 10 through a selected communication network to the recipient device 11 and (ii) a completion receipt of the transmitted data packet by the recipient device 11.

The communication apparatus 10 starts to transmit the data packet at time Ts. The recipient device 11 starts to receive the data packet at time Tr, and has completely received the whole of the data packet transmitted from the communication apparatus 10 at time Te. Immediately after completely receiving the whole of the data packet transmitted from the communication apparatus 10, the recipient device 11 transmits, to the communication apparatus 10, a safe-receipt acknowledgement signal (ACK signal), and the communication apparatus receives the ACK signal at time Ta.

The time Ts, i.e., the data-packet transmission start time Ts, and the time Ta, i.e., the ACK signal receipt time Ta, included in the times Ts, Tr, Te, and Ta can be directly measured by the communication apparatus 10.

In contrast, the time Tr, i.e., the data-packet receipt start time Tr, and the time Te, i.e., the data-packet receipt completion time Te, can be measured by only the recipient device 11. Adding the data-packet receipt start time Tr and/or the data-packet receipt completion time Te to the ACK signal as additional information in the recipient device 11 enables the communication apparatus 10 to acquire the data-packet receipt start time Tr and/or the data-packet receipt completion time Te.

In FIG. 4, reference character Dk represents a time interval from the data-packet transmission start time Ts to the data-packet receipt start time Tr; the time interval Dk represents a transmission delay in the upstream direction. Reference character Ek represents a duration from the data-packet receipt start time Tr to the data-packet receipt completion time Te; the duration Ek represents a packet receipt duration for which a receipt of the data packet has continued.

Reference character Fk represents a time interval from the data-packet receipt completion time Te to the ACK signal receipt time Ta; the time interval Fk represents a transmission delay in the downstream direction. Reference character Rk represents round-trip time defined from the data-packet transmission start time Ts to the ACK signal receipt time Ta; the round-trip time Rk corresponds to a "difference time".

Let us assume that the time of the complete receipt of a data packet is the data-packet receipt completion time Te, i.e., the time at which the whole of the data packet transmitted from the communication apparatus 10 has completely received by the recipient device 11 or at which the ack signal ACK has been just transmitted from the recipient device 11.

In this assumption, a data transmission period Wk can be defined by the following formula (1):

$$Wk = Dk + Ek \qquad (1)$$

The data transmission period acquiring unit 121 calculates the data transmission period Wk using (i) the data-packet transmission start time Ts measured by the communication apparatus 10 and (ii) the data-packet receipt completion time Te included in the ACK signal in accordance with the following formula (2):

$$\begin{aligned} Wk &= Dk + Ek \\ &= (Tr - Ts) + (Te - Tr) \\ &= Te - Ts \end{aligned} \qquad (2)$$

This enables the data transmission period acquiring unit 121 to acquire the data transmission period Wk.

That is, because the data transmission period acquiring unit 121 calculates the data transmission period Wk using both the data-packet transmission start time Ts measured by the communication apparatus 10 and (ii) the data-packet receipt completion time Te measured by the recipient device 11, accurate calculation of the data transmission period Wk needs time synchronization between the communication apparatus and the recipient device 11. For example, it is preferable that the communication apparatus 10 and the recipient device 11 correct time deviations therebetween using GPS to accordingly maintain time synchronization with each other.

If the communication apparatus 10 and the recipient device 11 cannot maintain time synchronization with each other, the data transmission period acquiring unit 121 can calculate the data transmission period Wk in accordance with the following formula (3) assuming that the uplink transmission delay Dk and the downlink transmission delay Fk are substantially equal to each other:

$$\begin{aligned} Wk &= Dk + Ek \\ &= \{(Rk - Ek)/2\} + Ek \\ &= (Rk + Ek)/2 \end{aligned} \qquad (3)$$

The round-trip time Rk can be calculated based on the data-packet transmission start time Ts and the ACK signal receipt time Ta measured by the communication apparatus 10. The recipient device 11 can subtract the data-packet receipt start time Tr from the data-packet receipt completion time Te to accordingly calculate a difference of the data-packet receipt start time Tr from the data-packet receipt completion time Te, and transmit the calculated difference to the communication apparatus 10. This enables the communication apparatus 10 to receive the difference, thus acquiring the calculated difference as the packet receipt duration Ek. Because the packet receipt duration Ek represents an absolute difference between the data-packet receipt completion time Te and the data-packet receipt start time Tr, the packet receipt duration Ek is immune from time deviation between the communication apparatus and the recipient device 11. Because the ACK signal receipt time Ta is independent of information from the recipient device 11, the ACK signal receipt time Ta is not affected by the deviation between the communication apparatus 10 and the recipient device 11.

The uplink transmission delay Dk is usually greater by far than the packet receipt duration Ek. Using this matter enables an approximate value of the data transmission period Wk to be calculated in accordance with the following formula (4) assuming that the packet receipt duration Ek is ignored:

$$\begin{aligned} Wk &= Dk + Ek \\ &\approx Rk/2 \end{aligned} \qquad (4)$$

The above describes how to calculate the data transmission period Wk using the data-packet receipt completion time Te as the time of the complete receipt of a data packet.

Alternatively, the time of the complete receipt of a data packet can be assumed as the ACK signal receipt time Ta, i.e., the time at which the communication apparatus 10 receives the ACK signal in place of the data-packet receipt completion time Te.

In this assumption, the data transmission period Wk can be defined by the following formula (5):

$$Wk = Rk \qquad (5)$$

This definition enables the data transmission period acquiring unit 121 to calculate the data transmission period Wk based on the round-trip time Rk measured by the communication apparatus 10 without information from the recipient device 11. Because the data transmission period Wk can be acquired without information from the recipient device 11, making it possible to acquire the data transmission period Wk that is immune from time deviation between the communication apparatus 10 and the recipient device 11.

If the communication device 10 is installed in a motor vehicle, the communication environments around each communication network dynamically change. From this viewpoint, the data transmission period acquiring unit 121 can be configured to acquire, each time the communication section 110 receives the ACK signal, the latest data transmission period Wk based on the latest receipt time of the ACK signal. This makes it possible to acquire the data transmission period Wk on which the communication environments at or around the current time are reflected.

Transmission Ready Determiner 122

The transmission ready determiner 122 is configured to determine whether each communication unit is ready to perform data-packet transmission in accordance with whether the corresponding communication unit is transmitting one of the data packets. In particular, the transmission ready determiner 122 is configured to determine whether a transmission waiting state of each communication unit, which waits for completion of a data-packet transmission, has changed to a transmission-ready state that enables data-packet transmission. The phrase "the transmission waiting state of each communication unit has changed to the transmission-ready state" means that the corresponding communication unit is in a state of no data-packet transmission.

The first, second, and third communication units 111, 112, and 113 independently operate to transmit data packets concurrently, so that the times at which the transmission waiting states of the respective communication units are shifted to the transmission-ready states are different from one another. From this viewpoint, the transmission ready determiner 122 is configured to monitor the communication section 110 to accordingly determine whether each communication unit 111, 112, 113 is ready to perform data-packet transmission. For example, the transmission ready determiner 122 can be configured to scan the first to third communication units 111 to 113 sequentially to accordingly check whether each communication unit 111, 112, 113 is ready to perform data-packet transmission.

Figure 5:
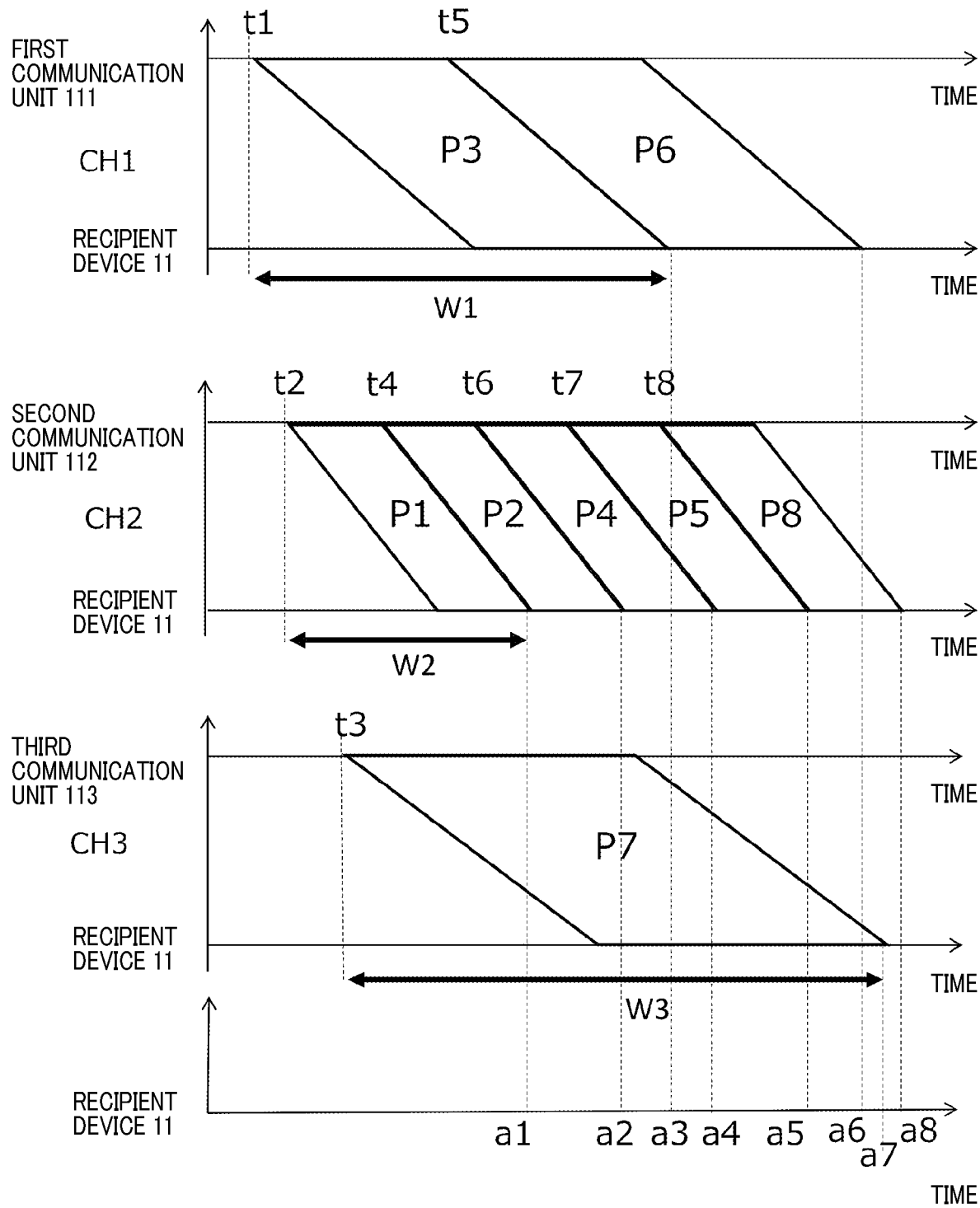
FIG. 5 is a timing chart illustrating how a transmission ready determiner performs transmission-ready state determination and a data packet selected by a data packet selector.

For example, FIG. 5 shows that the first communication unit 111 has been in the transmission waiting state until time t1, and has changed to the transmission-ready state at the time t1. The transmission ready determiner 122 determines that the first communication unit 111 is in the transmission-ready state at the time t1. This results in the data packet allocator 1232 allocating a new data packet to the first communication unit 111.

Next, the transmission ready determiner 122 determines that the second communication unit 112 is in the transmission-ready state at time t2. This results in the data packet allocator 1232 allocating a new data packet to the second communication unit 112.

Similarly, the transmission ready determiner 122 determines that the third communication unit 113 is in the transmission-ready state at time t3. This results in the data packet allocator 1232 allocating a new data packet to the third communication unit 113.

Thereafter, the transmission ready determiner 122 iteratively determines whether each communication unit 111, 112, 113 is ready to perform data-packet transmission over time (see exemplary determination times t4, t5, . . . , t8).

How the transmission ready determiner 122 selects one of the data packets to be transmitted by one of the communication units 111, 112, and 113 will be described during descriptions of the buffer offset calculator 1231.

As described above, allocating data packets to the communication units 111, 112, and 113 in accordance with determination of whether the respective communication units 111, 112, and 113 are ready to perform data-packet transmission enables data-packet allocation, which is suitable for the real-time communication situations of the communication units 111, 112, and 113. This therefore avoids the occurrence of out-of-order data packets at the recipient device 11 more effectively than a conventional allocation of data packets to the communication units 111, 112, and 113.

Data Packet Selector 123

In response to determination, by the transmission ready determiner 122, that a specific one communication unit in the N communication units, i.e., a k-th communication unit in the N communication units (1st to N-th communication units) is ready to perform data-packet transmission, the data packet selector 123 is configured to select a data packet in the data packets, which should be transmitted by the k-th communication unit, and allocate the selected data packet to the k-th communication unit (k is a integer variable of any one of 1 to N).

The data packet selector 123 includes the buffer offset calculator 1231 and the data packet allocator 1232.

The buffer offset calculator 1231 is configured to calculate the buffer offset for the selected k-th communication unit in accordance with the total number of at least one data packet that is (i) transmittable by at least one m-th communication unit in the N communication units except for the selected k-th communication unit and (ii) completely received by the recipient device 11 within the data transmission period of the communication network corresponding to the k-th communication unit (m is each of variables 1 to N except for k).

The total number of at least one data packet that is (i) transmittable by the at least one m-th communication unit and (ii) completely receivable by the recipient device 11 within the data transmission period of the communication network corresponding to the k-th communication unit can be calculated in accordance with the data transmission period of each of the at least one m-th communication unit.

The phrase "complete receipt of at least one data packet can mean (i) a completion of receipt of the at least one data packet by the recipient device 11, (ii) a completion of transmission of a safe receipt for the at least one data packet from the recipient device 11 after the at least one data packet being received by the recipient device 11, or (iii) a completion of receipt of the safe receipt of the at least one data packet.

For example, the transmission ready determiner 122 determines that the third communication unit 113 is ready to perform data-packet transmission at the time t3 of FIG. 5. Then, the buffer offset calculator 1231 calculates the buffer offset for the third communication unit 113 in the following way in response to determination, by the transmission ready determiner 122, that the third communication unit 113 is ready to perform data-packet transmission.

As illustrated in FIG. 5, the data transmission period W3 of the communication network corresponding to the third communication unit 113 is represented as (a7-t3). The buffer offset calculator 1231 calculates the total number of at least one data packet that is (i) transmittable by the first and second communication units 111 and 112 except for the third communication unit 113 and (ii) completely received by the recipient device 11 within the data transmission period W3 from the time t3. In FIG. 5, because the first communication unit 111 has already started to transmit the data packet P3, at least one data packet that is transmittable by the first communication unit 111 after transmission of the data packet P3 within the data transmission period W3 is only the data packet P6. Similarly, in FIG. 5, because the second communication unit 112 has already started to transmit the data packet P1, one or more data packets that are transmittable by the second communication unit 112 after transmission of the data packet P1 within the data transmission period W3 are the data packets P2, P4, and P5.

Accordingly, the total number of at least one data packet that is (i) transmittable by the first and second communication units 111 and 112 except for the third communication unit 113 and (ii) completely received by the recipient device 11 is 4, so that the buffer offset for the third communication unit 113 is 4.

The data packet allocator 1232 selects, in a queue of non-transmitted data packets stored in the transmission buffer 100, one of the non-transmitted data packets; the beginning of the selected non-transmitted data packet is located offset by the buffer offset relative the beginning of the queue of the non-transmitted data packets stored in the transmission buffer 100. Then, the data packet allocator 1232 allocates the selected data packet to the k-th communication unit.

Figure 6:
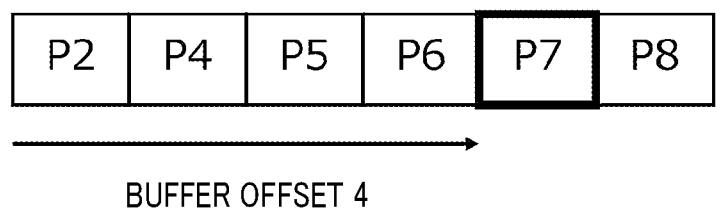
FIG. 6 is a diagram illustrating a buffer offset calculated by a buffer offset calculator.

FIG. 6 illustrates an example of a queue of non-transmitted data packets stored in the transmission buffer 100 at the time t3. That is, the queue of non-transmitted data packets P2, P4, P5, P6, P7 and P8 is stored in the transmission buffer 100. At that time, the data packet allocator 1232 selects, in the queue of the non-transmitted data packets P2, P4, P5, P6, P7 and P8 stored in the transmission buffer 100, the non-transmitted data packet P7, the beginning of which is located offset by the buffer offset of 4 relative the beginning of the queue of the non-transmitted data packets P2, P4, P5, P6, P7 and P8 stored in the transmission buffer 100. Then, the data packet allocator 1232 allocates the selected data packet P7 to the third communication unit 113.

As described above, the number of one or more non-transmitted data packets relative the beginning of the queue of the one or more non-transmitted data packets stored in the transmission buffer 100 is used as a parameter indicative of the buffer offset according to the first embodiment, but the present disclosure is not limited thereto. Specifically, any parameter indicative of the offset of a target data packet relative to the beginning of the queue of the non-transmitted data packets can be used. For example, the number of bytes relative to the beginning of queue of non-transmitted data packets stored in the transmission buffer 100 can be used as the parameter indicative of the buffer offset. Additionally, an increase in a pointer, which can indicate the addresses of the transfer buffer 10, such as a RAM, where non-transmitted data packets are stored, may be used.

How Communication Apparatus 10 Operates

Figure 7:
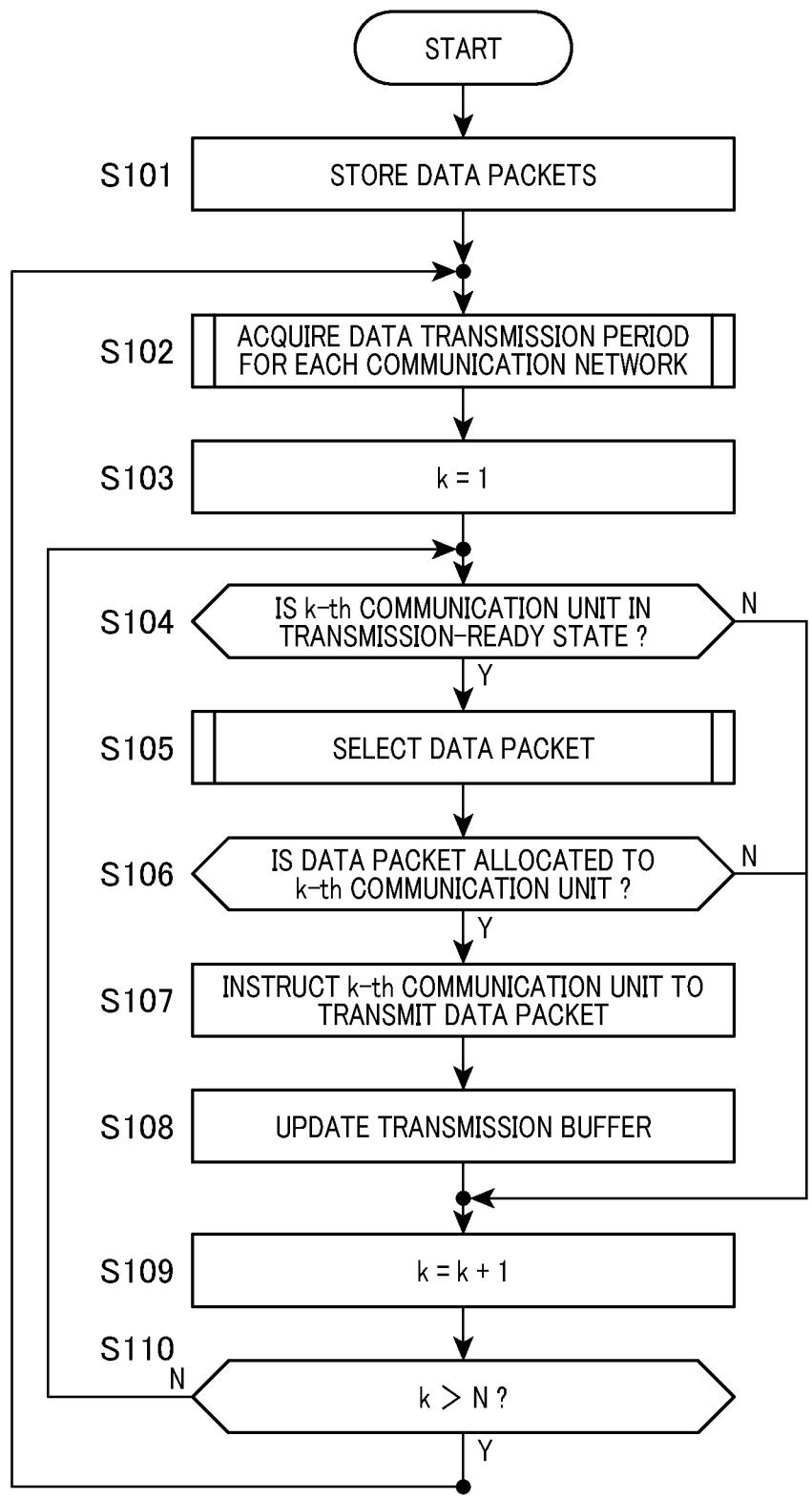
FIG. 7 is a flowchart illustrating a main routine carried out by the control apparatus of the first embodiment.
Figure 8:
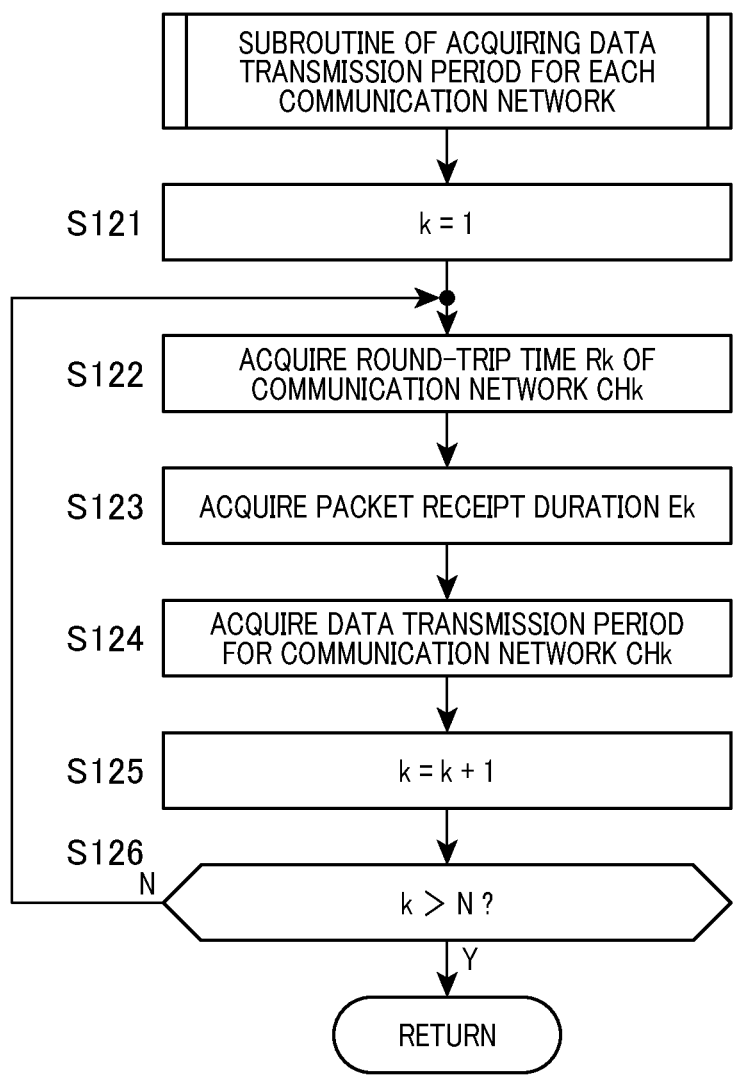
FIG. 8 is a flowchart illustrating a subroutine indicative of an operation of acquiring a data transmission period.
Figure 9:
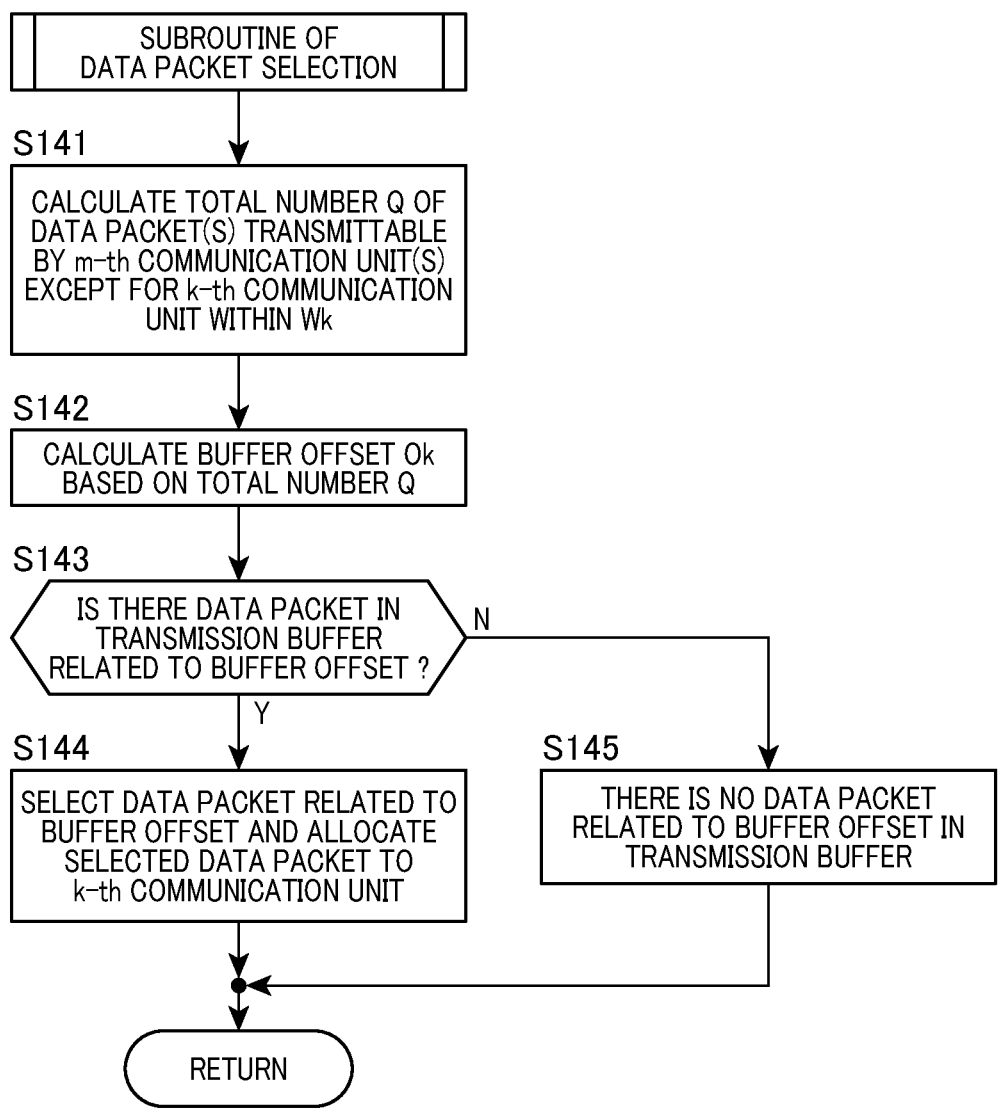
FIG. 9 is a flowchart illustrating a subroutine indicative of an operation of selecting one of data packets stored in a transmission buffer.

The following describes how the communication apparatus 10 of the first embodiment operates with reference to FIGS. 7 to 9.

The following operations of the communication apparatus 10 of the first embodiment show not only a communication method carried out by the communication apparatus 10 but also instructions of at least one communication program to be executed by the communication apparatus 10. The following steps of the communication method or the at least one communication program are not limited to the following order illustrated in FIGS. 7 to 9. That is, the order of any steps included in the communication method or the at least one communication program illustrated in FIGS. 7 to 9 can be changed to another order unless a limited order of any steps, which include a latter step programmed to use a result of a previous step, is required.

This can be similarly applied to the other embodiment(s) and modifications.

Main Routine

First, the following describes a main routine carried out by the communication apparatus 10 with reference to FIG. 7.

The transmission buffer 100 of the communication apparatus 10 stores data packets in an intended order of complete receipt of the data packets in the recipient device 11 in step S101. Each of the data packets can be stored in the transmission buffer 100 each time the corresponding one of the data packets is transmitted to the communication apparatus 10. If one of the data packets is transmitted to the communication apparatus 10 during execution of the following steps of the main routine illustrated in FIG. 7, the transmitted data packet is stored in the transmission buffer 100 concurrently with execution of the following steps of the main routine. That is, the main routine illustrated in FIG. 7 is a routine of transmitting the data packets stored moment by moment in the data buffer 100.

The data transmission acquiring unit 121 acquires, for each communication network, the data transmission period Wk required from transmitting of the data packets through the corresponding communication network to the "complete receipt" of the data packets by the recipient device 11 in step S102. The operation of acquiring the data transmission period Wk for each communication network in step S102 will be described later.

The communication controller 120 initializes the variable k to accordingly set the integer variable k to 1 in step S103.

Next, the transmission ready determiner 122 determines whether the transmission waiting state of the k-th communication unit in the N communication units has been shifted to the transmission-ready state that enables data-packet transmission in step S104. In response to determination that the transmission waiting state of the k-th communication unit has been shifted to the transmission-ready state that enables data-packet transmission (YES in step S104), the main routine proceeds to step S105. Otherwise, in response to determination that the transmission waiting state of each communication unit has not been shifted to the transmission-ready state that enables data-packet transmission (NO in step S104), the main routine proceeds to step S109.

The data packet selector 123 selects one of the data packets stored in the transmission buffer 100, which is scheduled to be transmitted, and allocates the selected data packet to the k-th communication unit in step S105. The operation of selecting one of the data packets stored in the transmission buffer 100 in step S105 will be described later.

The communication controller 120 determines whether the data packet that is scheduled to be transmitted is allocated to the k-th communication unit in step S106. In response to determination that the data packet that is scheduled to be transmitted is allocated to the k-th communication unit (YES in step S106), the communication controller 120 instructs the k-th communication unit to transmit the allocated data packet to the recipient device 11 in step S107. Otherwise, in response to determination that the data packet that is scheduled to be transmitted is not allocated to the k-th communication unit (NO in step S106), the main routine proceeds to step S109.

Following the operation in step S107, the transmission controller 120 updates the transmission buffer 100 in step S108. Specifically, the communication controller 120 removes information on the data packet transmitted by the k-th communication unit from the transmission buffer 100, and thereafter mover over, by a space corresponding to the removed data packet, the remaining data packets in the queue in step S108.

Next, the transmission controller 120 increments the variable k by 1 in step S109.

Following the operation in step S109, the transmission controller 120 determines whether the variable k is less than or equal to N in step S110. In response to determination that the variable k is less than or equal to N (NO in step S110), the operations in steps S104 to S108 are iterated for the k-th communication unit identified by the incremented variable k and the communication network corresponding to the k-th communication unit.

Otherwise, in response to determination that the variable k is more than N (YES in step S110), the main routine returns to the operation in step S102.

Subroutine of Operation of Acquiring Data Transmission Period Wk

The following describes a subroutine indicative of the operation of acquiring the data transmission period Wk for each communication network in step S102 with reference to a subroutine of FIG. 8.

The data transmission period acquiring unit 121 initializes the variable k to accordingly set the integer variable k to 1 in step S121.

Next, the data transmission period acquiring unit 121 acquires the round-trip time Rk of the communication network corresponding to the k-th communication unit in step S122. Specifically, the transmission period acquiring unit 121 can measure, as illustrated in FIG. 4, the data-packet transmission start time Ts and the ACK signal receipt time Ta, and calculate the difference of the data-packet transmission start time Ts from the ACK signal receipt time Ta to accordingly acquire the calculated difference as the round-trip time Rk of the communication network corresponding to the k-th communication unit.

The transmission period acquiring unit 121 acquires the packet receipt duration Ek of the communication network corresponding to the k-th communication unit in step S123. For example, as illustrated in FIG. 4, subtracting the data-packet receipt start time Tr from the data-packet receipt completion time Te enables the packet receipt duration Ek of the communication network corresponding to the k-th communication unit to be calculated.

Next, the transmission period acquiring unit 121 acquires the data transmission period Wk for the k-th communication unit in step S124. Specifically, the transmission period acquiring unit 121 calculates the data transmission period Wk for the k-th communication unit in accordance with, for example, the formula (3). Alternatively, the transmission period acquiring unit 121 can calculate the data transmission period Wk for the k-th communication unit in accordance with the formula (4) or (5), which makes it possible to acquire the data transmission period Wk for the k-th communication unit without execution of the operation in step S123.

The transmission period acquiring unit 121 increments the variable k by 1 in step S125.

Following the operation in step S125, the transmission period acquiring unit 121 determines whether the variable k is less than or equal to N in step S126. In response to determination that the variable k is less than or equal to N (NO in step S126), the operations in steps S122 to S124 are iterated for the k-th communication unit identified by the incremented variable k and the communication network corresponding to the k-th communication unit.

Otherwise, in response to determination that the variable k is more than N (YES in step S126), the subroutine returns to the operation in step S103 of the main routine.

Subroutine of Operation of Selecting Data Packet

The following describes a subroutine indicative of the operation of selecting one of the data packets stored in the transmission buffer 100 and allocating the selected data packet to the k-th communication unit in step S105 with reference to FIG. 9.

The buffer offset calculator 1231 calculates the total number, which will be referred to as Q, of at least one data packet that is (i) transmittable by the other m-th communication units except for the k-th communication unit and (ii) completely received by the recipient device 11 (m are one or more integer variables of 1 to N except for k) within the data transmission period Wk corresponding to the k-th communication unit in step S141; the k-th communication unit is determined to be in the transmission-ready state in step S104.

The buffer offset calculator 1231 acquires, based on the total number Q of at least one data packet, a buffer offset, which will be referred to as Ok in step S142. If the number of one or more data packets is defined as a parameter indicative of the buffer offset, the buffer offset calculator 1231 acquires the total number Q of at least one data packet as the buffer offset Ok.

The data packet allocator 1232 determines whether there is a non-transmitted data packet that is located offset by the buffer offset Ok relative to the beginning of the queue of the non-transmitted data packets stored in the transmission buffer 100 in step S143. In response to determination that there is a non-transmitted data packet that is located offset by the buffer offset Ok relative to the beginning of the queue of the non-transmitted data packets stored in the transmission buffer 100 (YES in step S143), the data packet allocator 1232 allocates the non-transmitted data packet to the k-th communication unit in step S144. Otherwise, in response to determination that there is no non-transmitted data packet that is located offset by the buffer offset Ok relative to the beginning of the queue of the non-transmitted data packets stored in the transmission buffer 100 (NO in step S143), the data packet allocator 1232 does not allocate any data packet to the k-th communication unit in step S145. After the operation in step S144 or S145, the subroutine returns to the operation in step S106 of the main routine.

Exemplary Specific Operations of Communication Apparatus 10

The following describes exemplary specific operations of the communication apparatus 10 while focusing on data-packet allocation and transmission-buffer updating with reference to FIGS. 10 to 15.

The exemplary specific operations of the communication apparatus 10 are carried out on the assumption that N is set to 3 so that the three communication networks are used.

Figure 10:
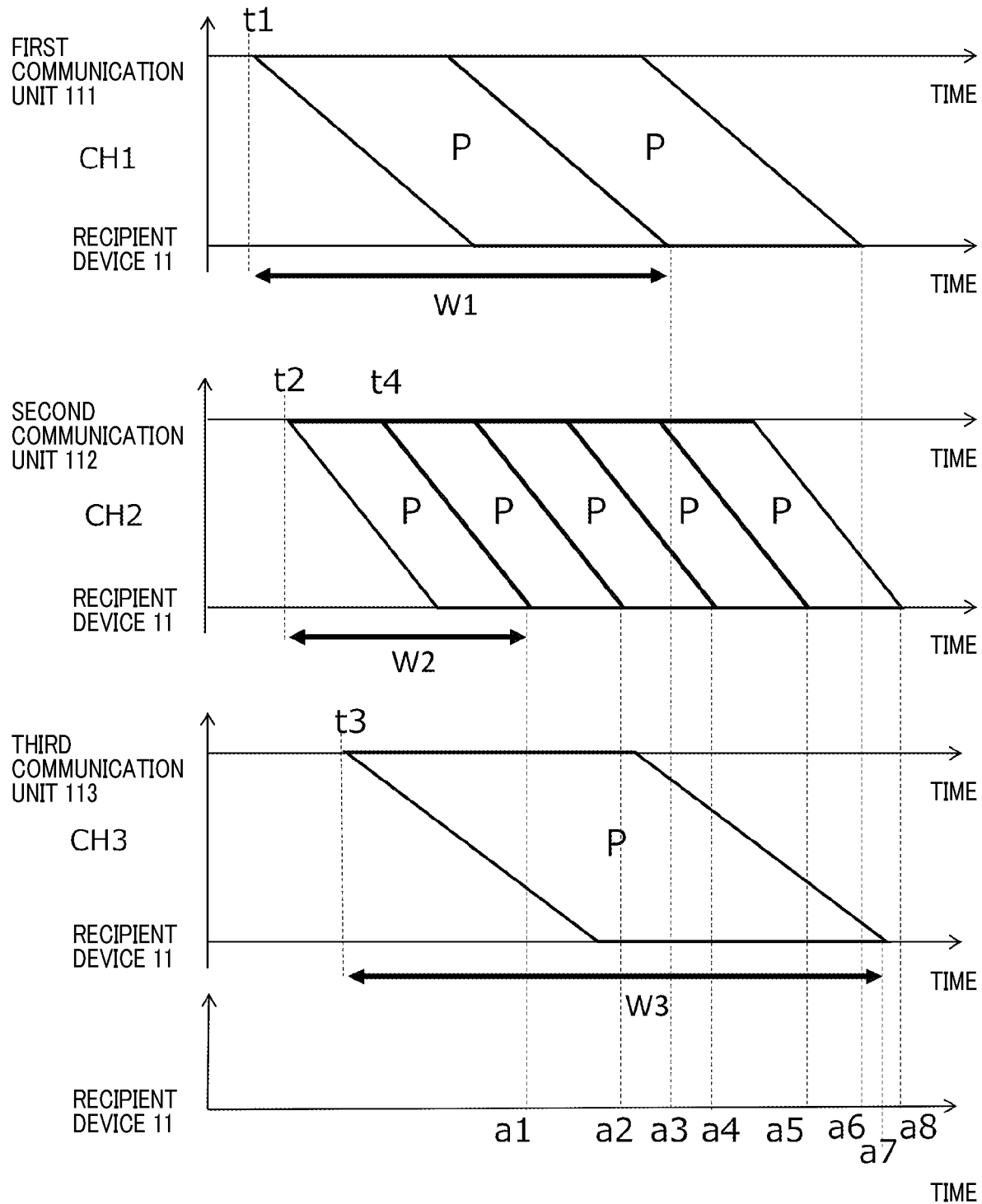
FIG. 10 is a timing chart illustrating specific operations of the communication apparatus of the first embodiment.

As illustrated in FIG. 10, the first communication unit 111 can transmit data packets from time t1, the second communication unit 112 can transmit data packets from time t2, and the third communication unit can transmit data packets from time t3. That is, the first communication unit 111 has been in the transmission waiting state until the time t1, the second communication unit 112 has been in the transmission waiting state until the time t2, and the third communication unit 113 has been in the transmission waiting state until the time t3. In other words, each of the first, second, and third communication units 111, 112, and 113 cannot transmit data packets until the respective times t1, t2, and t3. In FIG. 10, each rhombus represents a corresponding data packet. The length of the base of at least one rhombus corresponding to at least one data packet, which is scheduled to be transmitted by one of the first to third communication units 111 to 113, is different from that of the base of at least one rhombus corresponding to at least one data packet, which is scheduled to be transmitted by another one of the first to third communication units 111 to 113. This is because, although each data packet has the same fixed length, i.e., the same size, the communication rates of the respective communication networks of the first to third communication units 111 to 113, i.e., the data transmission speeds of the respective communication networks of the first to third communication units 111 to 113, are different from one another.

Figure 11:
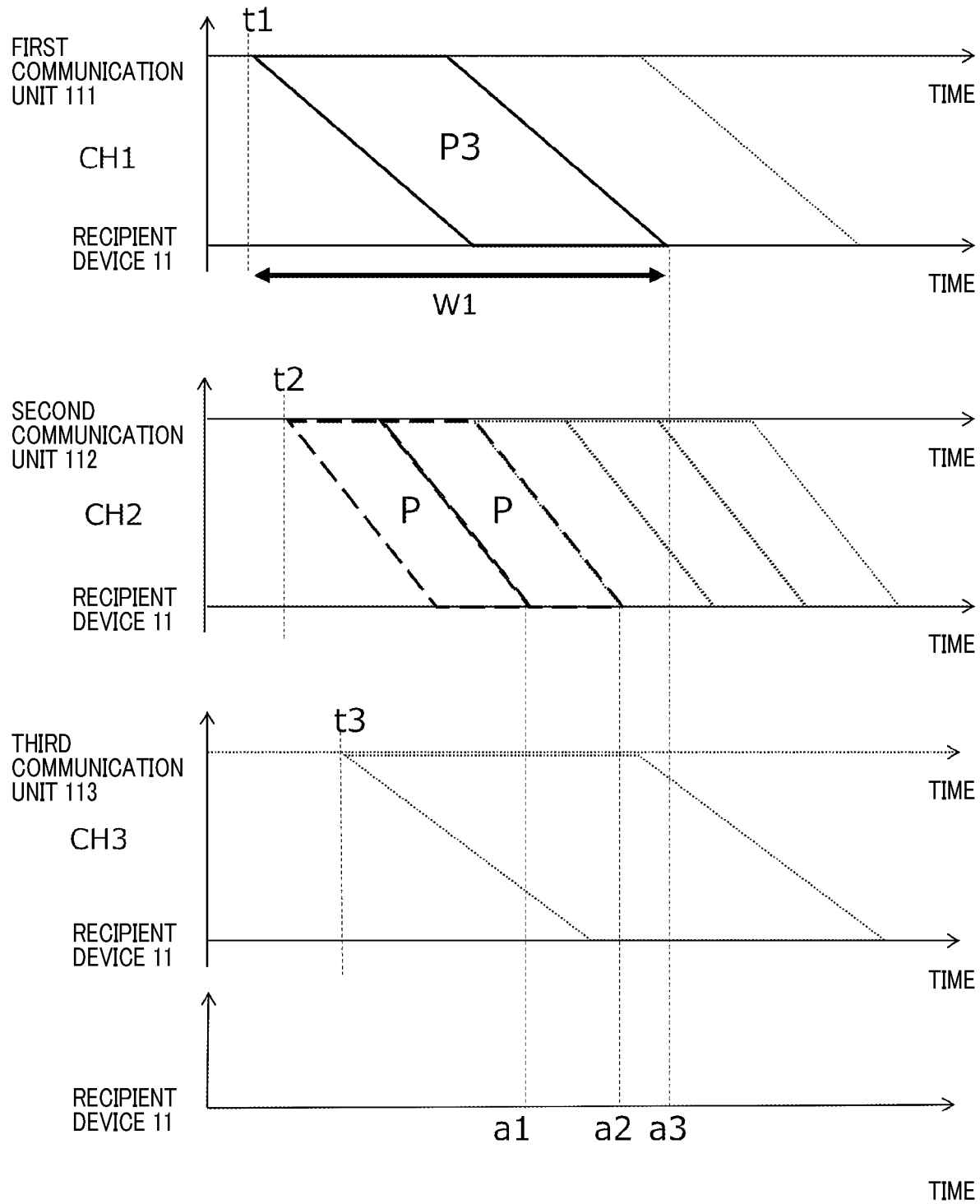
FIG. 11 is a timing chart illustrating specific operations of the communication apparatus of the first embodiment.

FIG. 11 is a situation of each communication network at the time t1. At the time t1, the transmission ready determiner 122 determines that the first communication unit 111 is in the transmission-ready state.

FIG. 11 shows that, when transmission of a data packet is started from the first communication unit 111 at the time t1, receipt of the data packet is completed by the recipient device 11 at time a3. During the data transmission period W1 defined from the time t1 to the time a3, the number of at least one data packet that is (i) transmittable by the second and third communication units 112 and 113 except the first communication unit 111 and (ii) completely received by the recipient device 11 within the data transmission period W1 is 2. This is because the number of at least one data packet that is (i) transmittable by the second communication unit 112 and (ii) completely received by the recipient device 11 within the data transmission period W1 is 2, and the number of at least one data packet that is (i) transmittable by the third communication unit 113 and (ii) completely received by the recipient device 11 within the data transmission period W1 is 0.

This results in the buffer offset calculator 1231 calculating the buffer offset of 2.

Figure 15A:
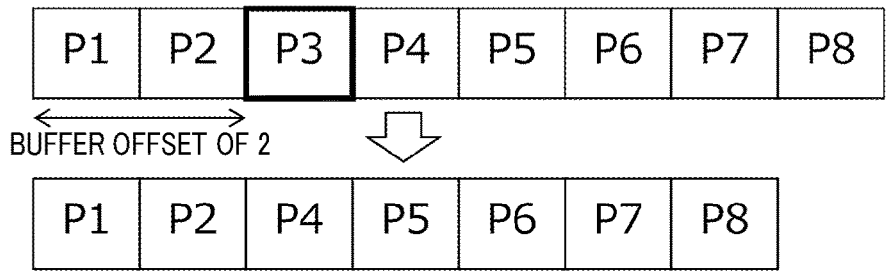
FIGS. 15A to 15D is a joint timing chart illustrating specific operations of the communication apparatus of the first embodiment.

Then, as illustrated in FIG. 15A, the data packet P3, which is located offset by the buffer offset of 2 relative the beginning of the queue of the non-transmitted data packets P1 to P8 stored in the transmission buffer 100, is allocated as a data packet to the first communication unit 111 at time t equal to the time t1; the allocated data packet is scheduled to be transmitted by the first communication unit 111. Thereafter, the transmission buffer 100 is updated so that the data packet P3 is eliminated from the transmission buffer 100.

Figure 12:
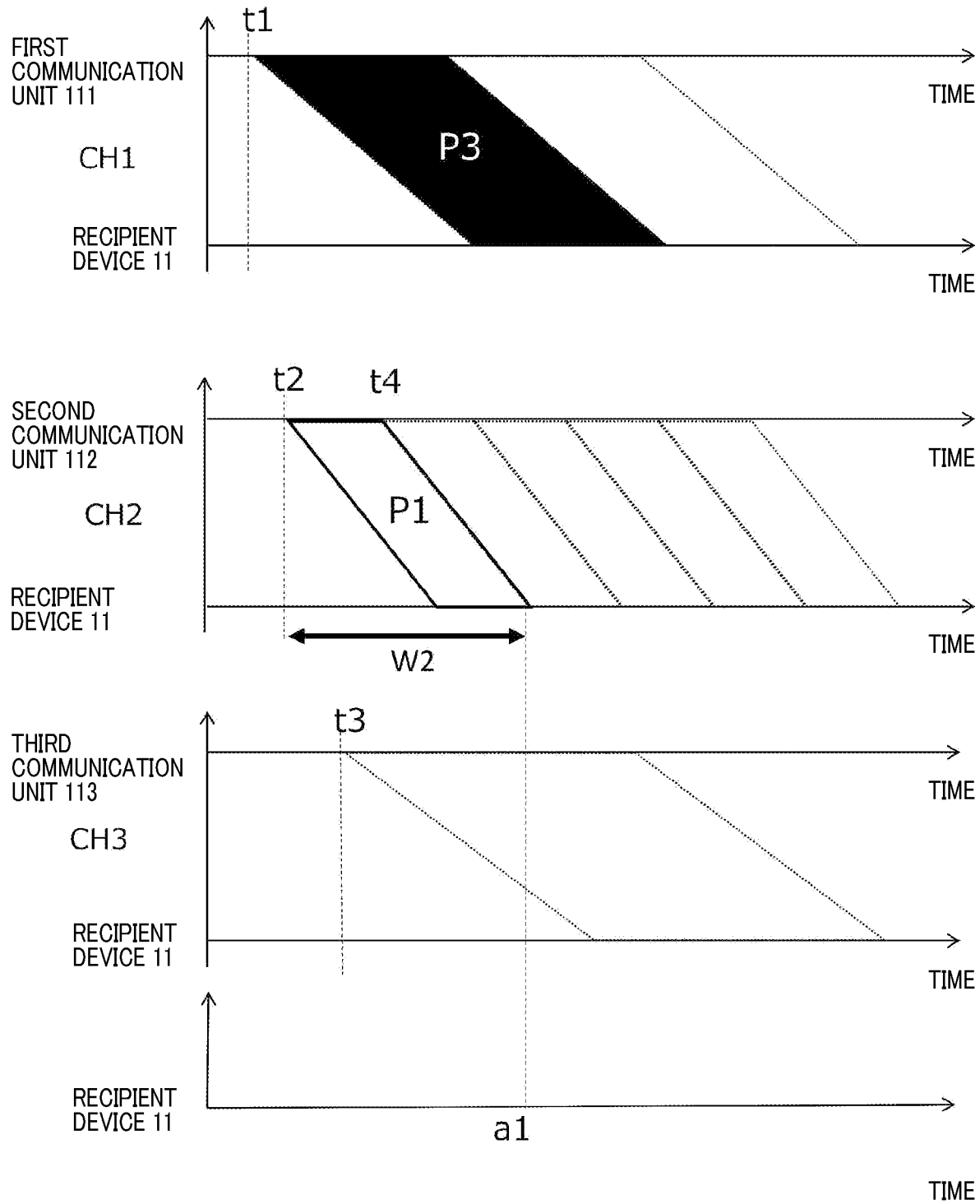
FIG. 12 is a timing chart illustrating specific operations of the communication apparatus of the first embodiment.

FIG. 12 is a situation of each communication network at the time t2. At the time t2, the transmission ready determiner 122 determines that the second communication unit 112 is in the transmission-ready state. At the time t2, because the first communication unit 111 is transmitting the data packet P3, the first communication unit 111 is not in the transmission-ready state.

FIG. 12 shows that, when transmission of a data packet is started from the second communication unit 112 at the time t2, receipt of the data packet is completed by the recipient device 11 at time a1. During the data transmission period W2 defined from the time t2 to the time a1, the number of at least one data packet that is (i) transmittable by the first and third communication units 111 and 113 except the second communication unit 112 and (ii) completely received by the recipient device 11 within the data transmission period W2 is 0. This is because the number of at least one data packet that is (i) transmittable by the first communication unit 111 and (ii) completely received by the recipient device 11 within the data transmission period W2 is 0, and the number of at least one data packet that is (i) transmittable by the third communication unit 113 and (ii) completely received by the recipient device 11 within the data transmission period W2 is 0.

This results in the buffer offset calculator 1231 calculating the buffer offset of 0.

Figure 15B:
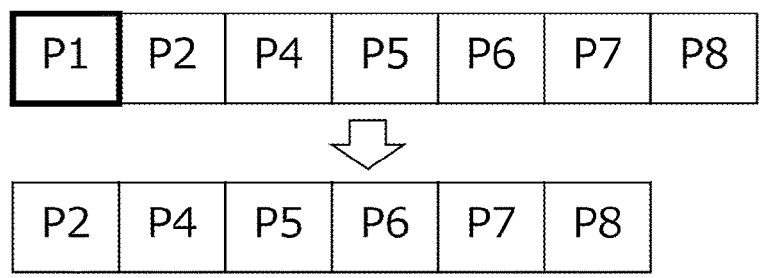

Then, as illustrated in FIG. 15B, the data packet P1, which is located offset by the buffer offset of 0 relative the beginning of the queue of the non-transmitted data packets P1, P2, and P4 to P8 stored in the transmission buffer 100, is allocated as a data packet to the second communication unit 112 at time t equal to the time t2; the allocated data packet is scheduled to be transmitted by the second communication unit 112. Thereafter, the transmission buffer 100 is updated so that the data packet P1 is eliminated from the transmission buffer 100.

Figure 13:
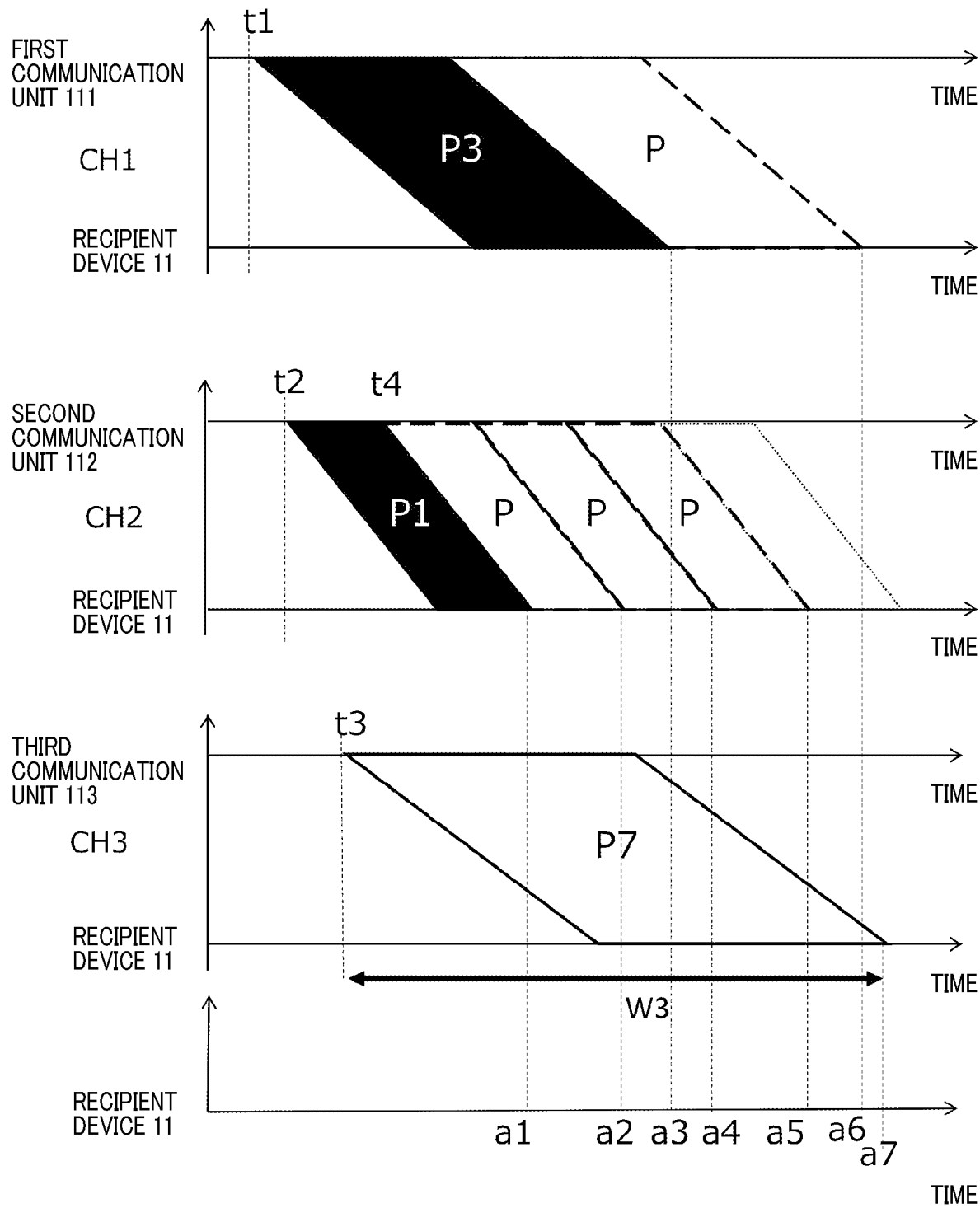
FIG. 13 is a timing chart illustrating specific operations of the communication apparatus of the first embodiment.

FIG. 13 is a situation of each communication network at the time t3. At the time t3, the transmission ready determiner 122 determines that the third communication unit 113 is in the transmission-ready state. At the time t3, because the first communication unit 111 is transmitting the data packet P3, the first communication unit 111 is not in the transmission-ready state. Similarly, at the time t3, because the second communication unit 112 is transmitting the data packet P1, the second communication unit 112 is not in the transmission-ready state.

FIG. 13 shows that, when transmission of a data packet is started from the third communication unit 113 at the time t3, receipt of the data packet is completed by the recipient device 11 at time a7. During the data transmission period W3 defined from the time t3 to the time a7, the number of at least one data packet that is (i) transmittable by the first and second communication units 111 and 112 except the third communication unit 113 and (ii) completely received by the recipient device 11 within the data transmission period W3 is 4. This is because the number of at least one data packet that is (i) transmittable by the first communication unit 111 and (ii) completely received by the recipient device 11 within the data transmission period W3 is 1, and the number of at least one data packet that is (i) transmittable by the second communication unit 112 and (ii) completely received by the recipient device 11 within the data transmission period W2 is 3.

This results in the buffer offset calculator 1231 calculating the buffer offset of 4.

Figure 15C:
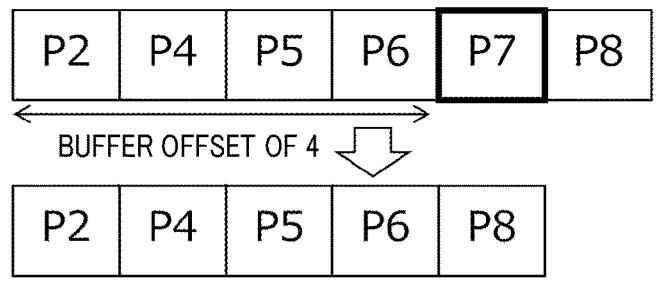

Then, as illustrated in FIG. 15C, the data packet P7, which is located offset by the buffer offset of 4 relative the beginning of the queue of the non-transmitted data packets P2 and P4 to P8 stored in the transmission buffer 100, is allocated as a data packet to the third communication unit 113 at time t equal to the time t3; the allocated data packet is scheduled to be transmitted by the third communication unit 113. Thereafter, the transmission buffer 100 is updated so that the data packet P7 is eliminated from the transmission buffer 100.

Figure 14:
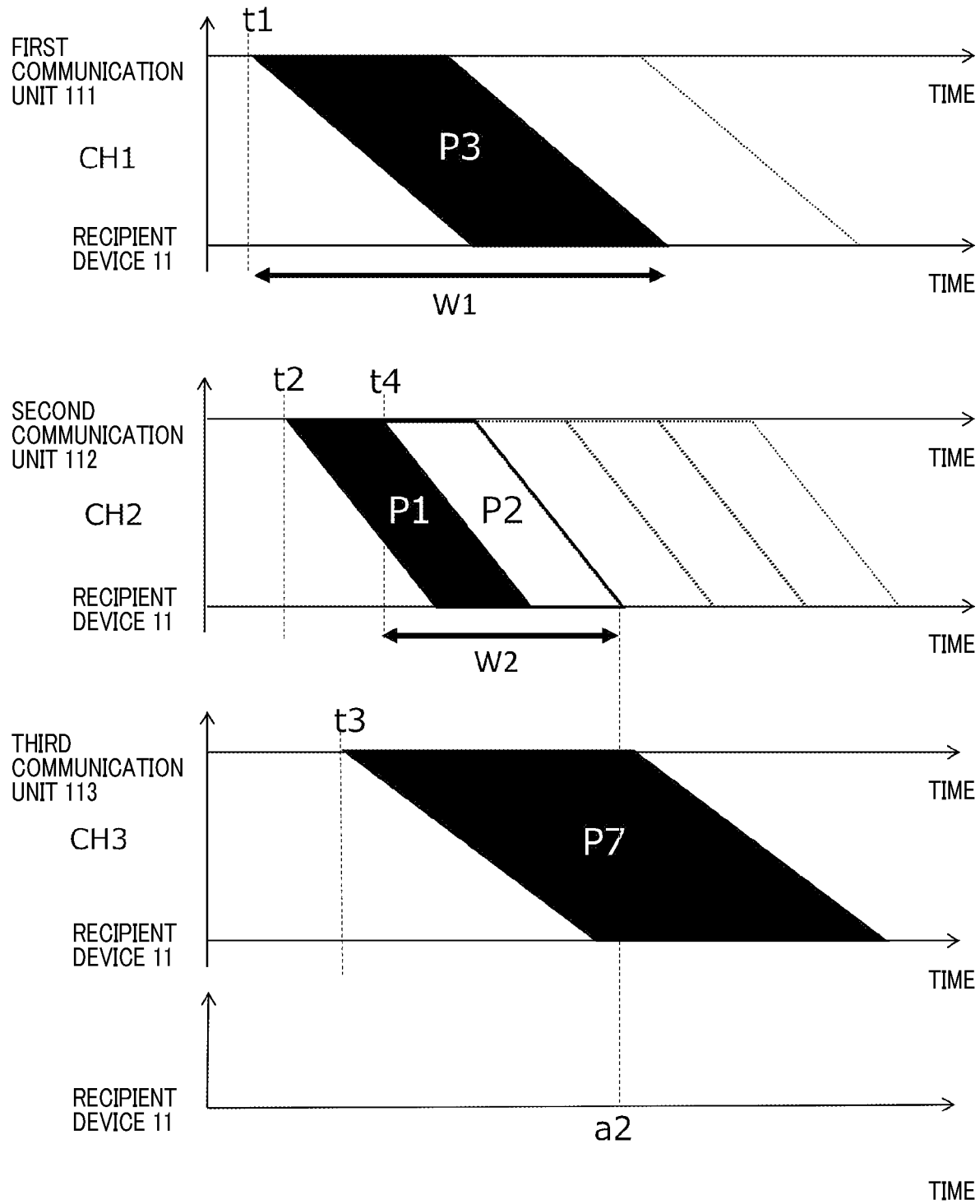
FIG. 14 is a timing chart illustrating specific operations of the communication apparatus of the first embodiment.

FIG. 14 is a situation of each communication network at time t4. At the time t4, the transmission ready determiner 122 determines that the second communication unit 112 is in the transmission-ready state, because transmission of the data packet P1 has been terminated at the time t4 so that the transmission waiting state of the second communication unit 112 has been shifted to the transmission-ready state at the time t4.

FIG. 14 shows that, when transmission of a data packet is started from the second communication unit 112 at the time t4, receipt of the data packet is completed by the recipient device 11 at time a2. During the data transmission period W2 defined from the time t4 to the time a2, the number of at least one data packet that is (i) transmittable by the first and second communication units 111 and 112 except the third communication unit 113 and (ii) completely received by the recipient device 11 within the data transmission period W2 is 0. This is because the number of at least one data packet that is (i) transmittable by each of the first and third communication units 111 and 113 and (ii) completely received by the recipient device 11 within the data transmission period W2 is 0.

This results in the buffer offset calculator 1231 calculating the buffer offset of 0.

Figure 15D:
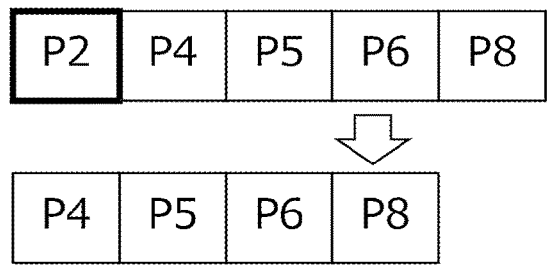

Then, as illustrated in FIG. 15D, the data packet P2, which is located offset by the buffer offset of 0 relative to the beginning of the queue of the non-transmitted data packets P2, P4, P5, P6, and P8 stored in the transmission buffer 100, is allocated as a data packet to the second communication unit 112 at time t equal to the time t4; the allocated data packet is scheduled to be transmitted by the second communication unit 112. Thereafter, the transmission buffer 100 is updated so that the data packet P2 is eliminated from the transmission buffer 100.

The above example illustrated in FIG. 10 uses the data transmission period Wk for a data packet as the period defined from the time at which transmission of the data packet is started to the time at which receipt of the data packet is completed by the recipient device 11. As an additional example, as the data transmission period Wk for a data packet, the round-trip time Rk for the data packet, which is defined from the time at which transmission of the data packet is started to the time at which the ACK signal ACK for the data packet is received by the recipient device 11, can be used. This additional example may result in the number of data packets to be transmitted by each communication unit decreasing. This additional example, however, achieves the following first and second advantages. Specifically, tis additional example is configured such that the communication apparatus 10 transmits a next data packet after receiving the ack signal ACK for the immediately previous data packet transmitted immediately previous to the next data packet, so that the communication apparatus 10 transmits the next data packet after acknowledging the receipt of the immediately previous data packet by the recipient device 11. This therefore achieves the first advantage of reducing the possibility of out-of-order of arrival of data packets in the recipient device 11, and the second advantage of preventing reliably lack of one or more data packets in the recipient device 11. The additional example is therefore effective in that the communication apparatus 10 uses a wireless communication network as each of the communication networks.

The operations of the communication apparatus 10 about how to allocate the data packets to the first to third communication units 111 to 113 from the time t1 to the time t4 have been described. Like the allocated data packets, each of the remaining data packets can be allocated to a selected at least one of the first to third communication units 111 to 113, which is determined by the transmission ready determiner 122 to be in the transmission-ready state.

Brief Summary of First Embodiment

The communication apparatus 10 of the first embodiment is configured to determine whether each of the communication units is communicable through the corresponding one of the communication networks, and allocate one of data packets to a selected communication unit that is determined to be communicable through the corresponding communication network with a recipient device. This configuration makes it possible to select one of the data packets, and, immediately after selection of one of the data packets, transmit the selected one of the data packets. This therefore enables, based on the communication environments around the communication apparatus 10, selection of one of the data packets immediately before transmission thereof.

The communication apparatus 10 of the first embodiment is additionally configured to calculate the buffer offset for a selected communication unit in accordance with the total number of at least one data packet that is (i) transmittable by the other one or more communication units except for the selected communication unit. This configuration therefore makes it possible to select any data packet from the queue of the data packets to be transmitted except for the leading data packet of the queue with simpler calculation load.

The communication apparatus 10 of the first embodiment can be configured to use a latest value of the round-trip time Rk as the data transmission period Wk for a selected one of the communication units. This configuration enables evaluation of the communication networks based on the latest information about the communication networks. This therefore further reduces the possibility of out-of-order of arrival of the data packets at the recipient device.

Second Embodiment

Configuration of Communication Apparatus 20

Figure 16:
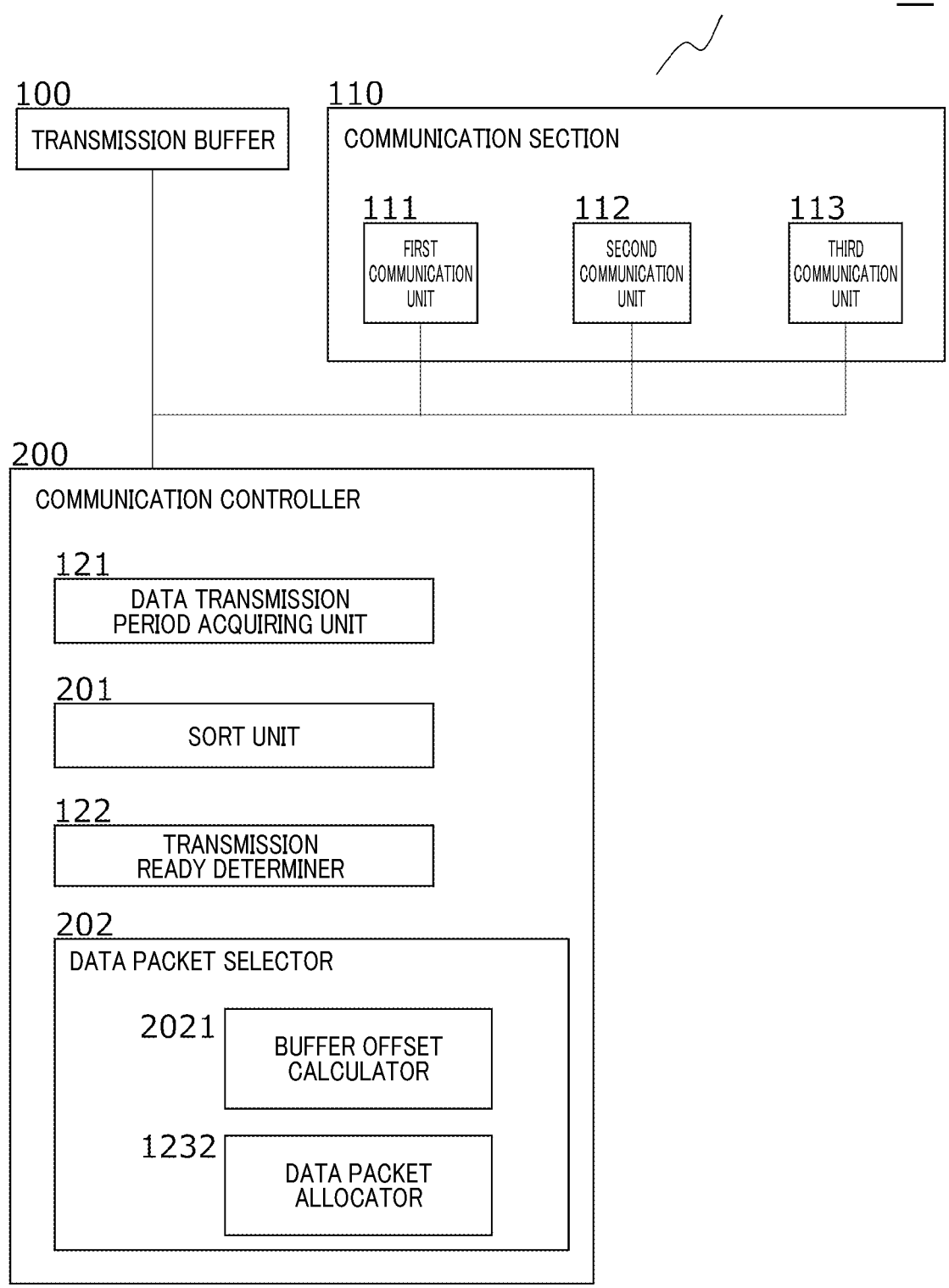
FIG. 16 is a block diagram illustrating a configuration of a communication apparatus according to the second embodiment.

The following describes an example of the configuration of the communication apparatus 20 according to the second embodiment with reference to FIG. 16.

Figure 2:
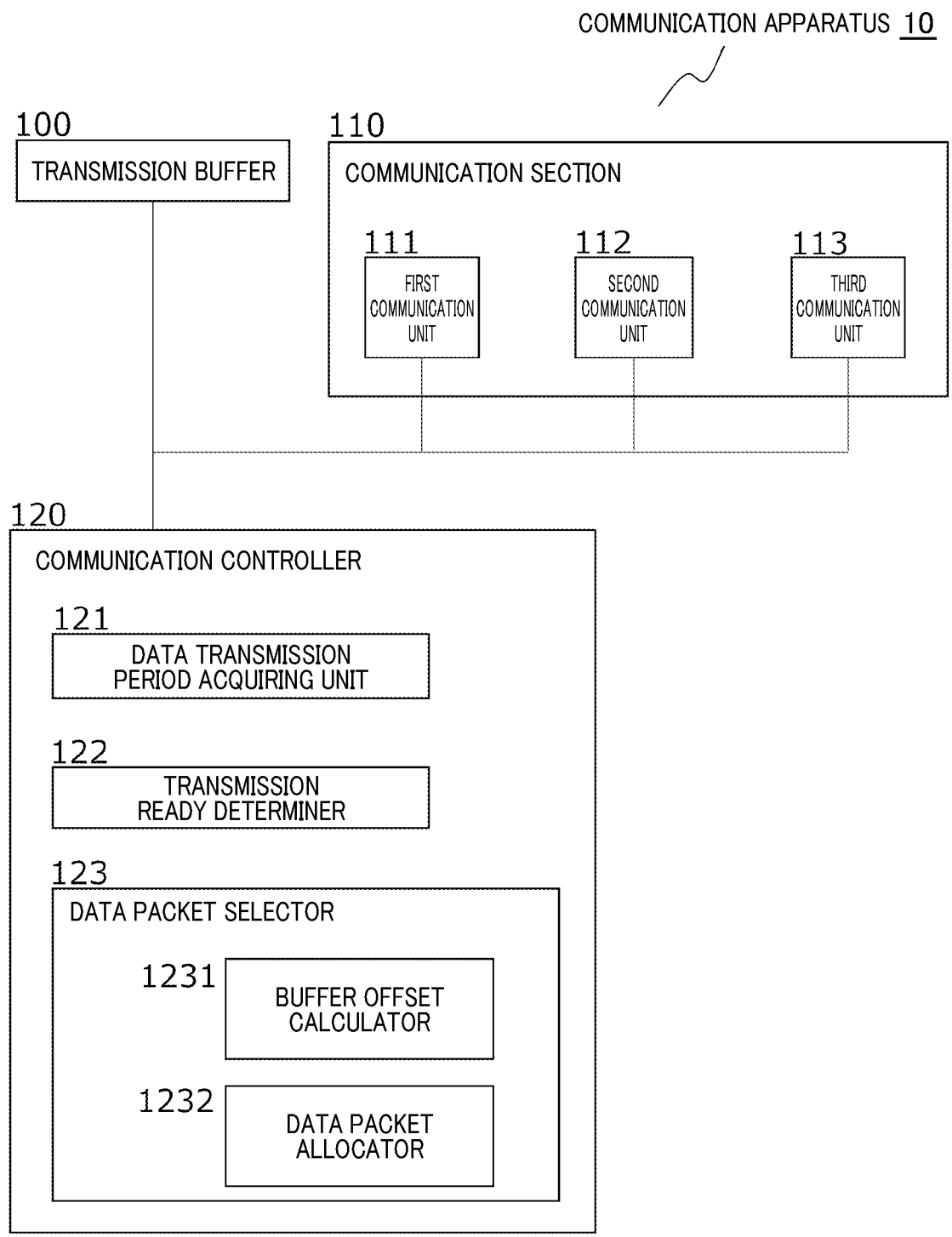
FIG. 2 is a block diagram illustrating a configuration of a communication apparatus according to the first embodiment.

In FIG. 16, the configuration of each selected component included in the communication apparatus 20 is identical to that of the corresponding component included in the communication apparatus 10 according to the first embodiment. Thus, to each extracted component included in the communication apparatus 20 illustrated in FIG. 16, a like reference character, which is assigned to the corresponding component included in the communication apparatus 10 illustrated in FIG. 2, is assigned. As to descriptions of each selected component of the communication apparatus 20, the descriptions of the corresponding component included in the communication apparatus 10 set forth above can be invoked.

There are different points of the communication apparatus 20 from the communication apparatus 10. The first different point is that the communication apparatus 20 includes a sort unit 201. The sort unit 201 is configured to sort a list of the communication units in ascending order of communication-rate of the communication networks respectively corresponding to the communication units. The second different point is that a data packet selector 202 of the communication apparatus 20 includes a buffer-offset calculator 2021 for calculating a buffer-offset for a selected communication unit based on the premise that the list of the communication units has been sorted in the ascending order of communication-rate of the communication units.

The communication apparatus 200 includes the data transmission period acquiring unit 121, the sort unit 201, the transmission ready determiner 122, and the data packet selector 123. The data packet selector 123 includes the buffer offset calculator 2021 and the data packet allocator 1232.

The sort unit 201 is configured to sort the present list of the N communication units in ascending order of communication-rate of the communication networks respectively corresponding to the N communication units, so that the list of the N communication units is sorted from the first communication unit, . . . , to the N-th communication unit in ascending order of their communication rates.

Figure 17:
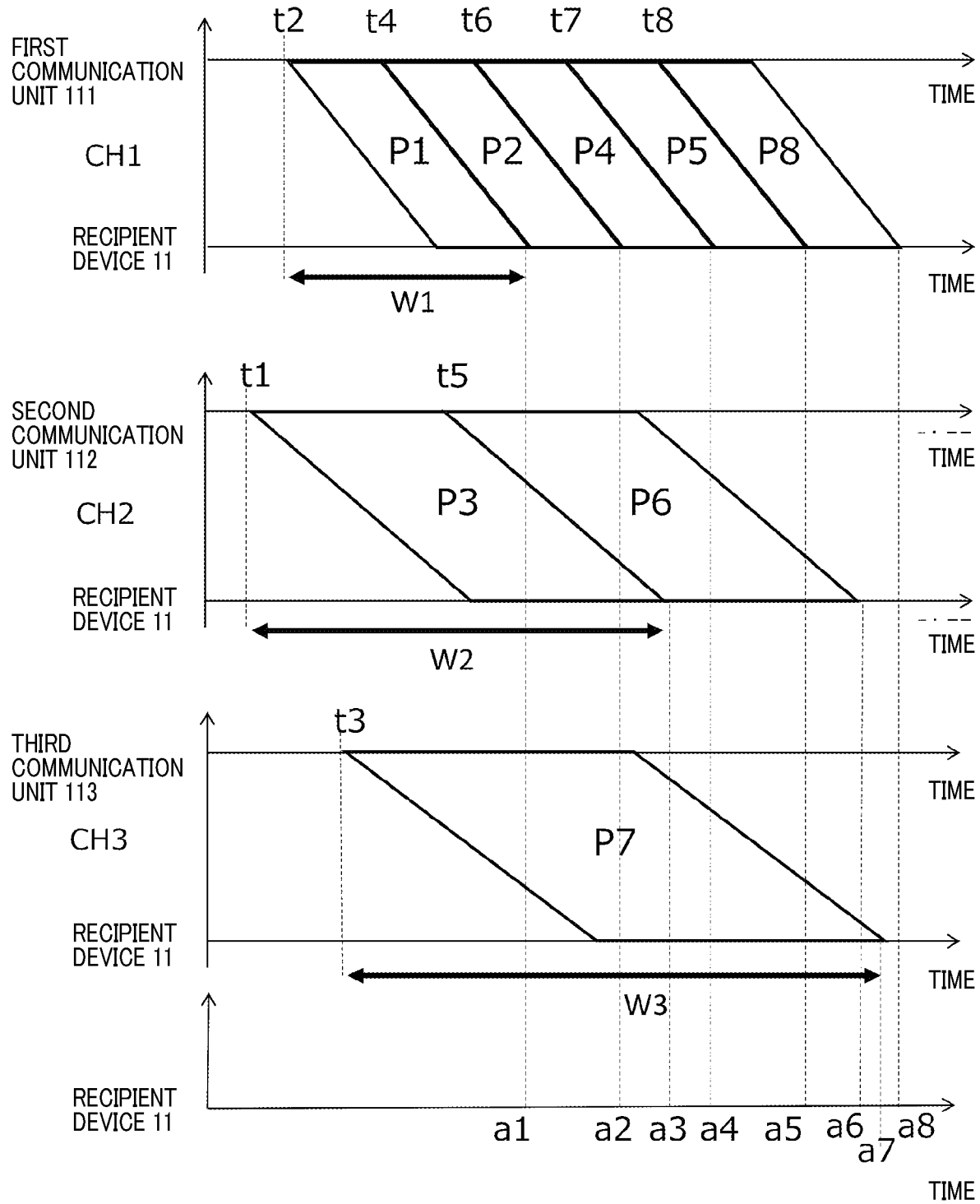
FIG. 17 is a diagram illustrating how a sort unit performs a sort operation.

The following describes the sorting task of the sort unit 201 with reference to FIGS. 5 and 17.

For example, let us assume that the data transmission period W1 for the communication unit 111, the data transmission period W2 for the communication unit 112, and the data transmission period W3 for the communication unit 113 have a predetermined relationship of W2<W1<W3.

In this assumption, the sort unit 201 of the second embodiment is configured to sort the present list of the communication unit 111, the communication unit 112, and the communication unit 113 in the order of the communication unit 112, the communication unit 111, and the communication unit 113 in accordance with the order of W2, W1, and W3. The communication unit 112, the communication unit 111, and the 30 communication unit 113 of the sorted list of the communication unit 112, the communication unit 111, and the communication unit 113 will be referred to as communication units A, B, and C.

Then, the sort unit 201 is configured to respectively reassign the indexes, i.e., the names, of "first communication unit 111", "second communication unit 112", and "third communication unit 113" to the communication units A, B, and C of the sorted list, resulting in the reassigned first, second, and third communication units 111, 112, and 113 being arranged in the sorted list in ascending order of communication-rate of W1, W2, and W3.

The sort unit 201 can be configured to change the frequency of sorting the present list of the three communication units in accordance with the level of change of the communication environments around the communication networks.

Alternatively, the sort unit 201 can be configured to sort the present list of the communication units when the order of complete receipt of data packets in the recipient device 11 is different from a storage order of the data packets in the transmission buffer 100; the storage order of the data packets represents that an order of the data packets being stored in the transmission buffer 100.

The buffer offset calculator 2021 is configured to calculate the buffer offset for the selected k-th communication unit in accordance with the total number of at least one data packet that is (i) transmittable by at least one m-th communication unit in the N communication units and (ii) completely received by the recipient device 11 within the data transmission period of the communication network corresponding to the k-th communication unit (m is each of variables 1 to k−1); the data transmission period of the at least one m-th communication unit is smaller than that of the k-th communication unit.

For example, FIG. 17 shows that, when the first communication unit 111 is determined to be in the transmission-ready state, the buffer offset for the first communication unit 111 is 0 at every time because there are no communication units whose data transmission periods are smaller than the data transmission period of the first communication unit 111.

FIG. 17 shows that, when the second communication unit 112 is determined to be in the transmission-ready state, the buffer offset for the second communication unit 112 is calculated based on the total number of at least one data packet that is (i) transmittable by the first communication unit 111 and (ii) completely received by the recipient device 11 within the data transmission period W2 for the second communication unit 112, because the data transmission period for the first communication unit 111 is only smaller than the data transmission period W2 for the second communication unit 112.

Additionally, FIG. 17 shows that, when the third communication unit 113 is determined to be in the transmission-ready state, the buffer offset for the third communication unit 113 is calculated based on the total number of at least one data packet that is (i) transmittable by each of the first and second communication units 111 and 112 and (ii) completely received by the recipient device 11 within the data transmission period W3 for the third communication unit 113, because the data transmission period for each of the first and second communication units 111 and 112 is smaller than the data transmission period W3 for the third communication unit 113.

Specifically, the buffer offset calculator 2021 calculates the buffer offset for the selected k-th communication unit without referring to at least one communication unit whose communication rate is lower than the communication rate of the selected k-th communication unit. This is because at least one communication unit whose communication rate is lower than the communication rate of the k-th communication unit that is determined to be in the transmission-ready state may not complete transmission of a data packet faster than the k-th communication unit even if the at least one communication unit is in the transmission-ready state.

Operation of Communication Apparatus 20

Figure 18:
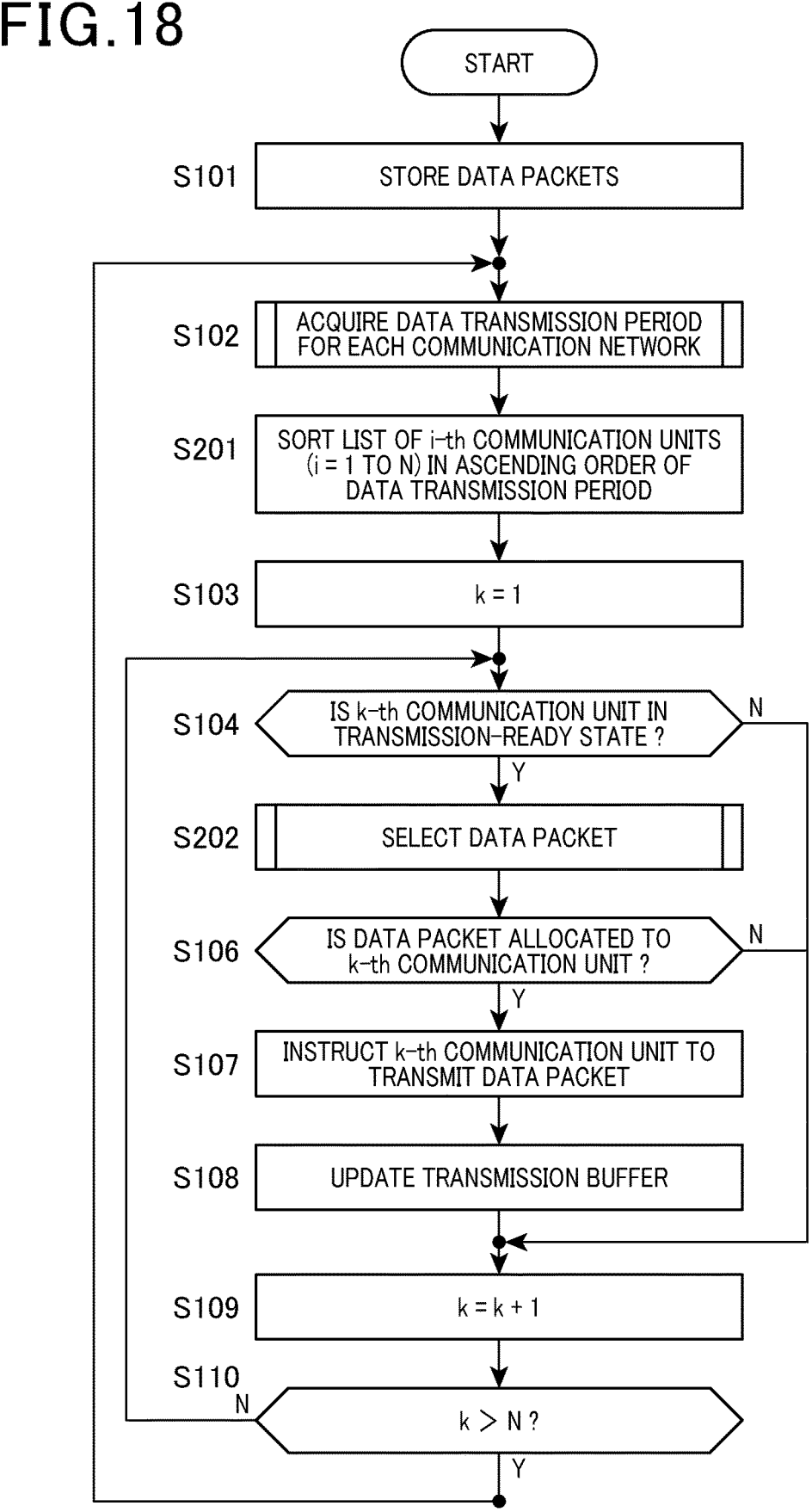
FIG. 18 is a flowchart illustrating a main routine carried out by the control apparatus of the second embodiment.
Figure 19:
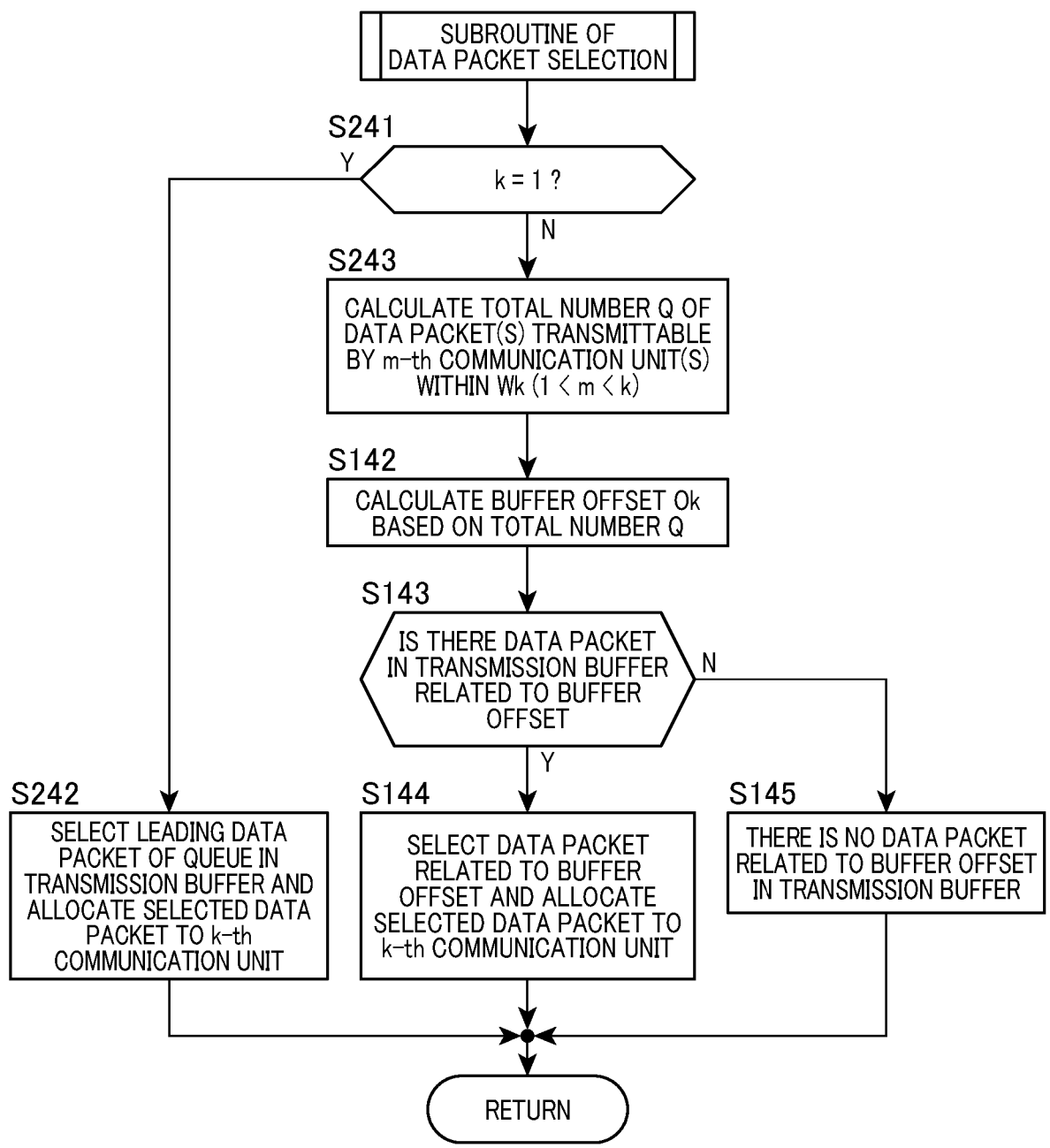
FIG. 19 is a flowchart illustrating a subroutine indicative of an operation of selecting one of data packets stored in a transmission buffer.
Figure 20:
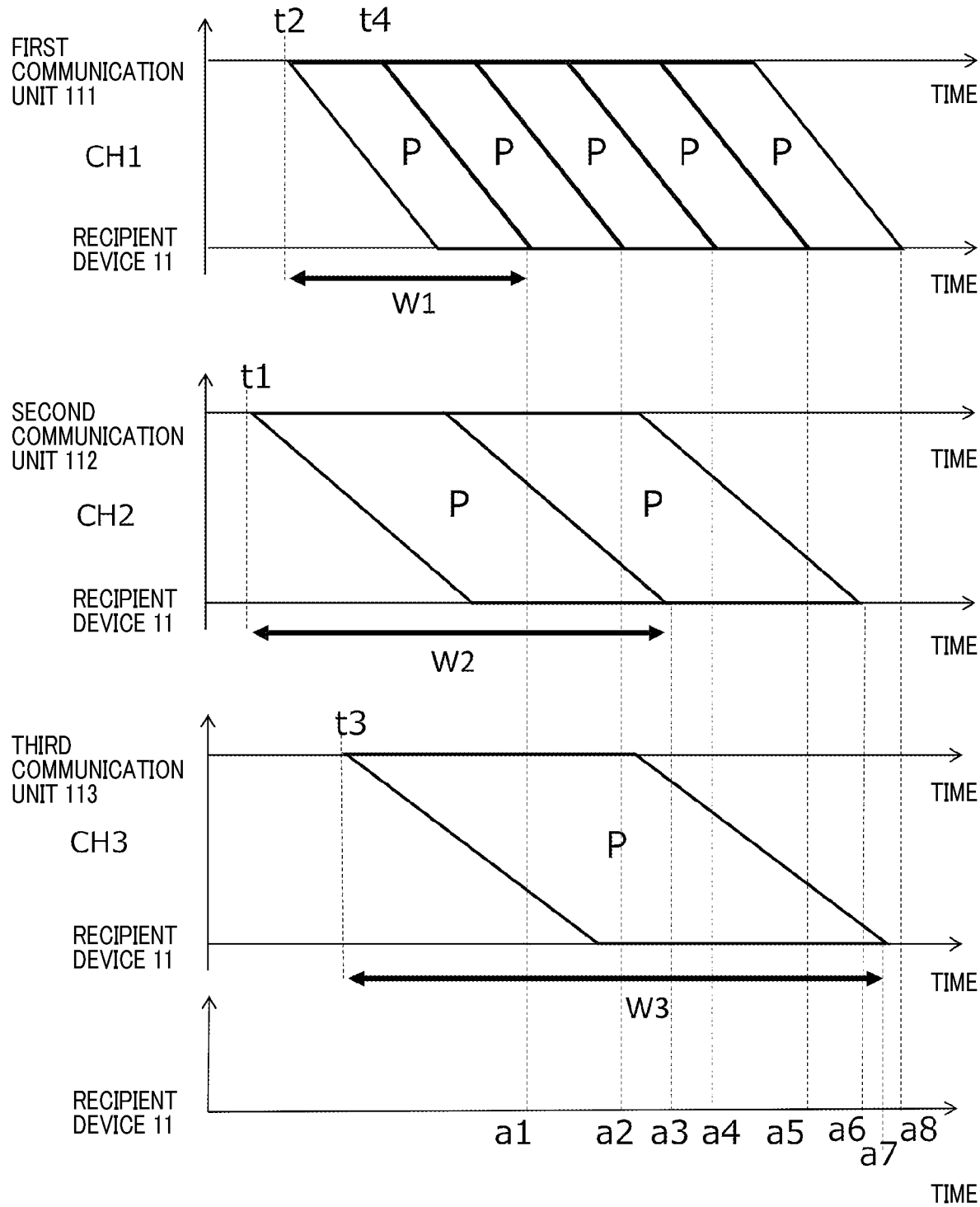
FIG. 20 is a timing chart illustrating specific operations of the communication apparatus of the second embodiment.

The following describes how the communication apparatus 20 of the second embodiment operates with reference to FIGS. 18 and 19.

To selected operations of the communication apparatus 20, which are similar to the corresponding operations of the communication apparatus 10 illustrated in FIGS. 7 to 9, the same step numbers are assigned, so that the descriptions of the corresponding operations of the communication apparatus 10 set forth above can be invoked to describe the selected operations of the communication apparatus 20.

After the operation in step S102, the sort unit 201 sorts the present list of the N communication units in ascending order of communication-rate of the communication networks respectively corresponding to the N communication units in step S201. For example, assuming that the N communication units are represented as i-th communication units (i is an integer index variable from 1 to N), the sort unit 201 reassigns the indexes i to the N communication units such that, the smaller the data transmission period for the i-th communication unit, the greater the integer index i.

The subsequent operations in steps S104, and S106 to S110 of the communication apparatus 20 after the operation in step S201 are substantially identical to the operations in steps S104, and S106 to S110 of the communication apparatus 10 except for the operation in step S202 illustrated in FIG. 18; the operation in step S202 selects one of the data packets stored in the transmission buffer 100, which is scheduled to be transmitted, and allocates the selected data packet to the k-th communication unit. That is, the operation in step S202 is different from that in step S105 of the communication apparatus 10, so that the operation in step S202 will be described hereinafter with reference to a subroutine illustrated in FIG. 19.

When starting the subroutine after the operation in step S104, the buffer offset calculator 2021 determines whether the k-th communication unit, which is determined to be in the transmission-ready state in step S104, is the first communication unit 111 having the shortest data transmission period in step S241. In other words, the buffer offset calculator 2021 determines whether the integer variable k of the k-th communication unit, which is determined to be in the transmission-ready state in step S104, is set to 1 in step S241. In response to determination that the k-th communication unit is the first communication unit 111, i.e., the integer variable k is set to 1 (YES in step S241), the subroutine proceeds to step S242. Otherwise, in response to determination that the k-th communication unit is not the first communication unit 111, i.e., the integer variable k is not set to 1 (NO in step S241), the subroutine proceeds to step S243.

In response to the affirmative determination in step S241, because the buffer offset for the first communication unit 111 is 0 at every time, the buffer offset calculator 2021 selects the leading data packet of the queue in the transmission buffer 100, and allocates the selected data packet to the first communication unit 111 in step S242.

Otherwise, in response to the negative determination in step S241, the buffer offset calculator 2021 calculates the total number Q of at least one data packet that is (i) transmittable by at least one m-th communication unit and (ii) completely received by the recipient device 11 (m is an integer variable lower than the integer variable k) within the data transmission period Wk for the communication network CHk corresponding to the k-th communication unit in step S243.

The subsequent operations in steps S142 to S145 of the communication apparatus 20 after the operation in step S142 illustrated in FIG. 19 are substantially identical to the corresponding operations in steps S142 to S145 of the communication apparatus 10 after the operation in step S142 illustrated in FIG. 9.

The operation in step S102 for acquiring the data transmission period Wk for each communication network and the operation in step S201 for sorting the present list of the N communication units are executed each time the loop from the operation in step S102 to the operation in step S110 is completed (see FIG. 18), but the frequency of execution of the operations in step S102 and S201 can be adjusted in accordance with the communication environments around the communication networks. For example, the operation in step S102 for acquiring the data transmission period Wk for each communication network and the operation in step S201 for sorting the present list of the N communication units can be executed each time the k-th communication unit receives the ACK signal. This modification enables the latest data transmission period Wk for each communication network to be reflected in the sorting task of the sort unit 201.

Exemplary Specific Operations of Communication Apparatus 20

The following describes exemplary specific operations of the communication apparatus 20 while focusing on data-packet allocation and transmission-buffer updating with reference to FIGS. 15 and 20 to 24. The exemplary specific operations of the communication apparatus 20 are carried out on the assumption that N is set to 3 so that the three communication networks are used.

Figure 21:
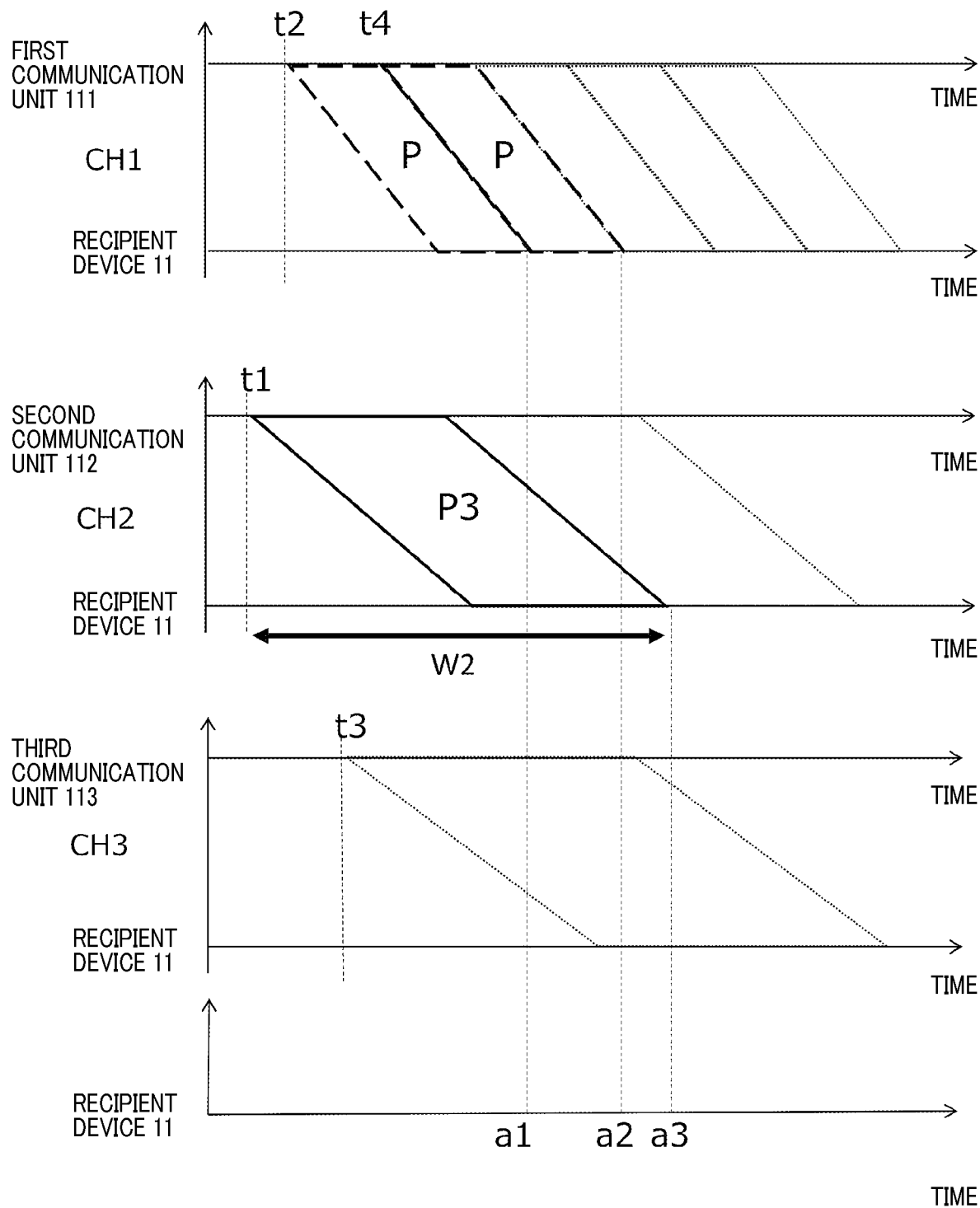
FIG. 21 is a timing chart illustrating specific operations of the communication apparatus of the second embodiment.

FIG. 21 is a situation of each communication network at time t1. At the time t1, the transmission ready determiner 122 determines that the second communication unit 112 is in the transmission-ready state.

FIG. 21 shows that, when transmission of a data packet is started from the second communication unit 112 at the time t1, receipt of the data packet is completed by the recipient device 11 at time a3. During the data transmission period W2 defined from the time t1 to the time a3, the number of at least one data packet that is (i) transmittable by the first communication unit 111 whose data transmission period is smaller than that of the second communication unit 112 and (ii) completely received by the recipient device 11 within the data transmission period W2 is 2.

This results in the buffer offset calculator 2021 calculating the buffer offset of 2.

Then, as illustrated in FIG. 15A, the data packet P3, which is located offset by the buffer offset of 2 relative the beginning of the queue of the non-transmitted data packets P1 to P8 stored in the transmission buffer 100, is allocated as a data packet to the second communication unit 112 at time t equal to the time t1; the allocated data packet is scheduled to be transmitted by the second communication unit 112. Thereafter, the transmission buffer 100 is updated so that the data packet P3 is eliminated from the transmission buffer 100.

Figure 22:
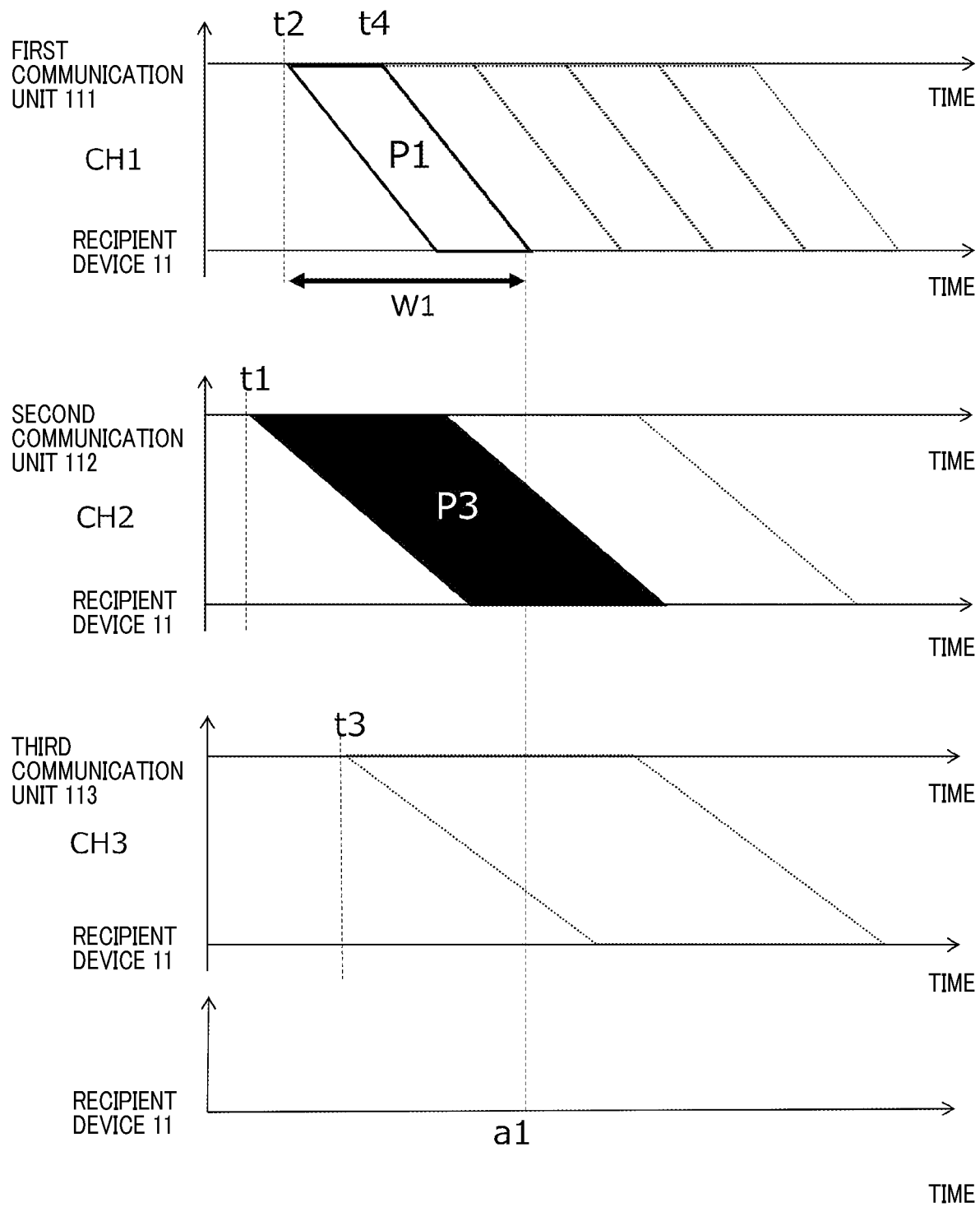
FIG. 22 is a timing chart illustrating specific operations of the communication apparatus of the second embodiment.

FIG. 22 is a situation of each communication network at time t2. At the time t2, the transmission ready determiner 122 determines that the first communication unit 111 is in the transmission-ready state.

FIG. 22 shows that the first communication unit 111 corresponds to the communication network whose data transmission period is the smallest in all the communication networks. This therefore results in, as illustrated in FIG. 15B, the data packet P1 located at the beginning of the queue of the non-transmitted data packets P1, P2, and P4 to P8 stored in the transmission buffer 100, being allocated as a data packet to the first communication unit 111. Thereafter, the transmission buffer 100 is updated so that the data packet P1 is eliminated from the transmission buffer 100.

Figure 23:
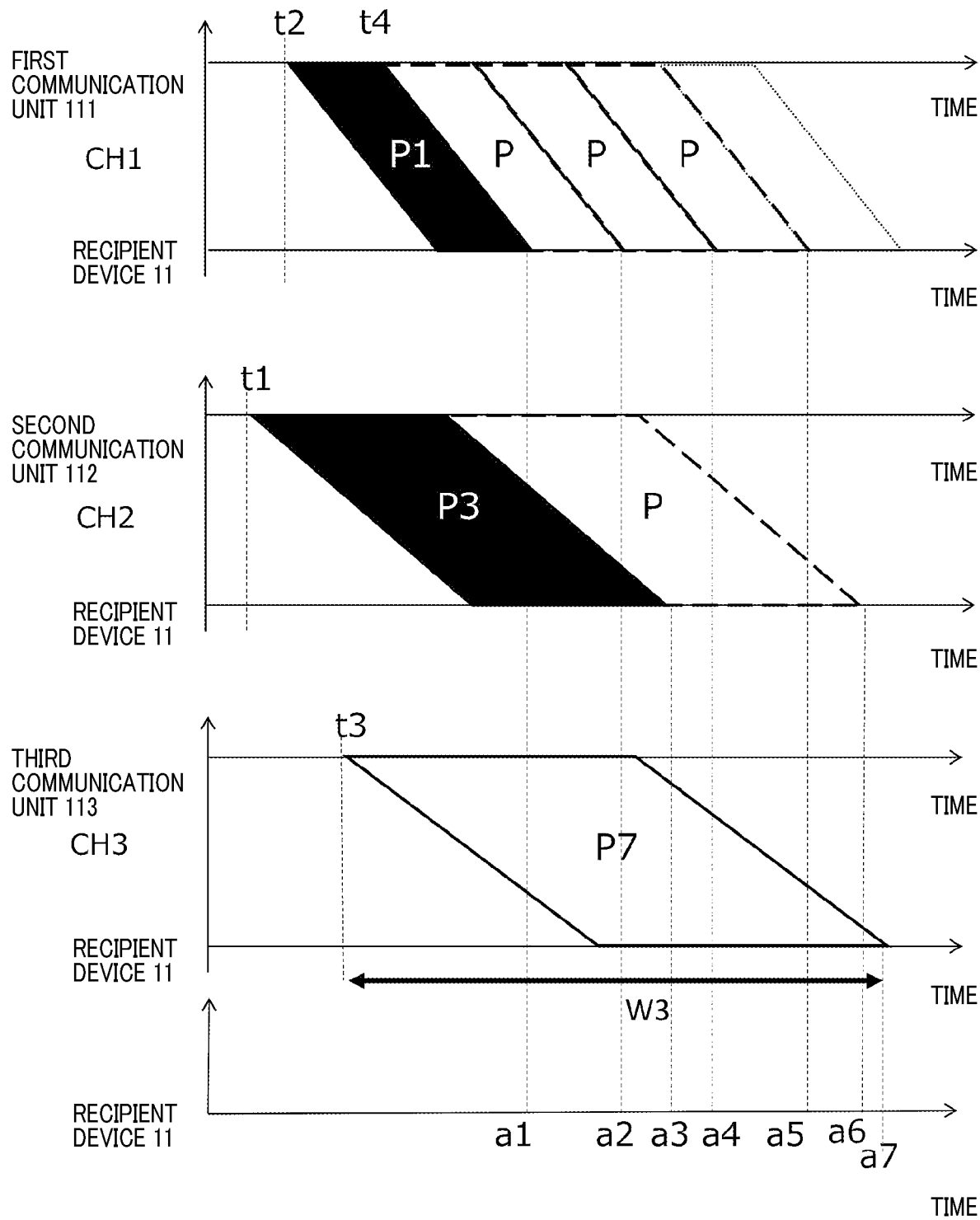
FIG. 23 is a timing chart illustrating specific operations of the communication apparatus of the second embodiment.

FIG. 23 is a situation of each communication network at time t3. At the time t3, the transmission ready determiner 122 determines that the third communication unit 113 is in the transmission-ready state. At the time t3, because the first communication unit 111 is transmitting the data packet P1, the first communication unit 111 is not in the transmission-ready state. Similarly, at the time t3, because the second communication unit 112 is transmitting the data packet P3, the second communication unit 112 is not in the transmission-ready state.

FIG. 23 shows that, when transmission of a data packet is started from the third communication unit 113 at the time t3, receipt of the data packet is completed by the recipient device 11 at time a7. During the data transmission period W3 defined from the time t3 to the time a7, the number of at least one data packet that is (i) transmittable by each of the first and second communication units 111 and 112 whose data transmission periods are smaller than that of the third communication unit 113 and (ii) completely received by the recipient device 11 within the data transmission period W3 is 4. That is, during the data transmission period W3 defined from the time t3 to the time a7, the number of at least one data packet that is (i) transmittable by the first communication unit 111 and (ii) completely received by the recipient device 11 within the data transmission period W3 is 3. During the data transmission period W3 defined from the time t3 to the time a7, the number of at least one data packet that is (i) transmittable by the second communication unit 112 and (ii) completely received by the recipient device 11 within the data transmission period W3 is 1.

This results in the buffer offset calculator 2021 calculating the buffer offset of 4.

Then, as illustrated in FIG. 15C, the data packet P7, which is located offset by the buffer offset of 4 relative the beginning of the queue of the non-transmitted data packets P2, and P4 to P8 stored in the transmission buffer 100, is allocated as a data packet to the third communication unit 113 at time t equal to the time t3; the allocated data packet is scheduled to be transmitted by the third communication unit 113. Thereafter, the transmission buffer 100 is updated so that the data packet P7 is eliminated from the transmission buffer 100.

Figure 24:
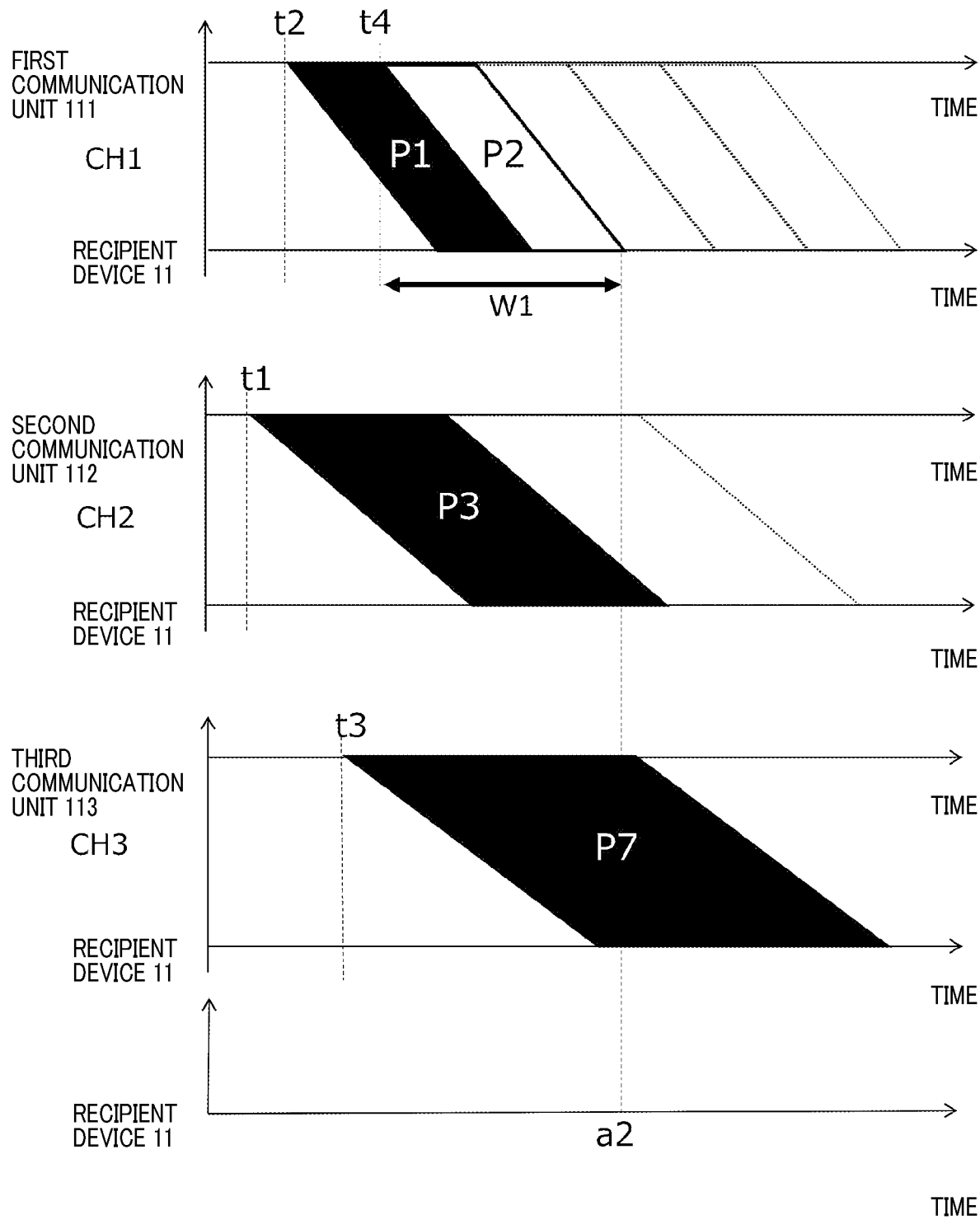
FIG. 24 is a timing chart illustrating specific operations of the communication apparatus of the second embodiment.

FIG. 24 is a situation of each communication network at time t4. At the time t4, the transmission ready determiner 122 determines that the first communication unit 111 is in the transmission-ready state.

FIG. 24 shows that the first communication unit 111 corresponds to the communication network whose data transmission period is the smallest in all the communication networks. This therefore results in, as illustrated in FIG. 15D, the data packet P2 located at the beginning of the queue of the non-transmitted data packets P2, P4 to P6, and P8 stored in the transmission buffer 100, being allocated as a data packet to the first communication unit 111. Thereafter, the transmission buffer 100 is updated so that the data packet P2 is eliminated from the transmission buffer 100.

The operations of the communication apparatus 20 about how to allocate the data packets to the first to third communication units 111 to 113 from the time t1 to the time t4 have been described. Like the allocated data packets, each of the remaining data packets can be allocated to a selected at least one of the first to third communication units 111 to 113, which is determined by the transmission ready determiner 122 to be in the transmission-ready state.

Brief Summary of Second Embodiment

The communication apparatus 20 of the second embodiment is configured such that
(I) The sort unit 21 sorts the list of the communication units in ascending order of communication-rate of the communication networks respectively corresponding to the communication units
(II) The buffer-offset calculator 2021 calculates the buffer-offset for a selected communication unit based on the premise that the list of the communication units has been sorted in the ascending order of communication-rate of the communication units This enables the process of the buffer offset unit 2021 to be simpler and the processing time of the buffer offset unit 2021 to be smaller.

Modifications

Timing of Acquiring Data Transmission Period

Sequence numbers may be assigned to the respective data packets; the sequence numbers represent the order of processing of the data packets. In this modification, in response to complete receipt of the data packets, the recipient device 11 may be configured to transmit, to the communication apparatus 10, 20, the ACK signal that includes the sequence numbers of the completely received data packets. This enables the communication apparatus 10, 20 to acknowledge whether the data packets have been completely received by the recipient device 11 in order of storage the data packets in the transmission buffer 100.

In this modification, the communication controller 120, 200 of the communication apparatus 10, 20 may be configured to determine whether the order of complete receipt of the data packets by the recipient device 11 agrees with the order of storage of the data packets in the transmission buffer 100, and instruct the data transmission period acquiring unit 121 to acquire, again, the data transmission period of each of subsequent data packets upon determination that the order of complete receipt of the data packets by the recipient device 11 does not agree with the order of storage of the data packets in the transmission buffer 100.

The communication apparatus 10, 20 configured set forth above makes it possible to estimate that the communication environments have changed upon determination that the order of arrival of the data packets at the recipient device 11 has been changed from the order of storage of the data packets in the transmission buffer 100. Then, the communication apparatus 10, 20 makes it possible to acquire the data transmission period of each of subsequent data packets upon determination that the order of arrival of the data packets at the recipient device 11 has been changed from the order of storage of the data packets in the transmission buffer 100. This therefore enables accurate allocation of the subsequent data packets to the communication units, thus preventing out-of-order of data packets in the recipient device 11.

Change of Calculation of Data Transmission Period

The data transmission period acquiring unit 121 can be configured to calculate the data transmission period in accordance with one of the formulas (2) to (5) set forth above. The formulas (2) to (5) may have different levels of accuracy from one another. Additionally, each of the formulas (2) to (5) may have individual information about whether the corresponding one of the formulas (2) to (5) needs time synchronization between the communication apparatus 10, 20 and the recipient device 11.

From this viewpoint, the data transmission period acquiring unit 121 can be configured to select one of the formulas (2) to (5) in accordance with the variations around the communication networks and/or information indicative of whether there has been out-of-order of arrival of previous data packets at the recipient device 11.

For example, because the data transmission period calculated in accordance with the formula (4) is an estimated value, the transmission period acquiring unit 121 can change the formula (4) used to calculate the data transmission period to the formula (3) if there have been out-of-order of arrival of data packets at the recipient device 11 at frequent intervals. Alternatively, the transmission period acquiring unit 121 can change the formula (4) used to calculate the data transmission period to the formula (5), which enables a calculated data transmission period to have a largest margin, if there have been out-of-order of arrival of data packets at the recipient device 11 at frequent intervals. The transmission period acquiring unit 121 can change the formula (4) used to calculate the data transmission period to the formula (2) if time synchronization can be established between the communication apparatus 10, 20 and the recipient device 11.

Window Control

The recipient device 11 of each of the first and second embodiments is configured to transmit the ACK signal to the communication apparatus 10, 20 in response to receiving a data packet, but the present disclosure is not limited thereto.

Specifically, each communication unit of the communication apparatus 10, 20 can be configured to establish a window size that specifies a range of one or more data packets transmittable without receiving the ACK signal. That is, each communication unit can be configured to execute window control that sequentially transmits one or more data packets within the corresponding window size without waiting 25 for the ACK signal.

Figure 25:
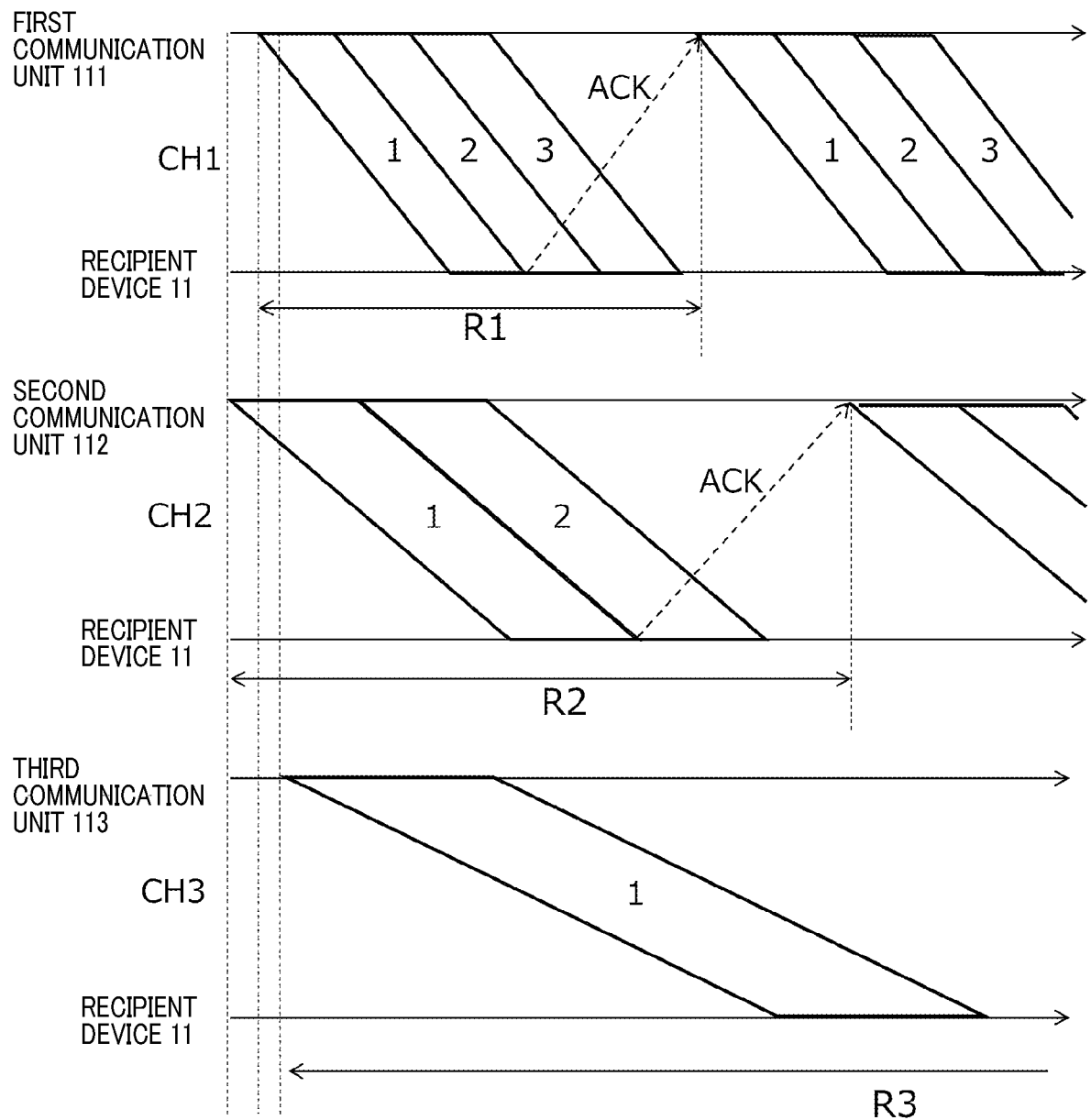
FIG. 25 is a timing chart illustrating how window control is carried out according to a modification of each of the first and second embodiments.

FIG. 25 illustrates an example where the first communication unit 111 has the window size of 3, the second communication unit 112 has the window size of 2, and the third communication unit 113 has the window size of 1. In this example, the buffer offset calculator 1231, 2021 can be configured to calculate the buffer offset for the k-th communication unit in accordance with the window sizes of the at least one m-th communication unit except for the k-th communication unit.

Complete Receipt of Data Packet

Some functional blocks, such as the transmission buffer 100, the data transmission period acquiring unit 121, the buffer offset calculator 1231, 2021, and the communication controller 100, 200 may require information on a "complete receipt of data packet(s)". The meaning of a "complete receipt of data packet(s)" can be identical for all the functional blocks or can be different between the functional blocks.

For example, the meaning of "complete receipt of a data packet" for the transmission buffer 100 can be defined as complete receipt of the data packet by the recipient device 11. The meaning of a "complete receipt of data packet(s)" for the data transmission period acquiring unit 121 can be defined as a receipt of the ACK signal for the data packet.

The characteristics of each embodiment of the present disclosure have been described above.

The terms used in the first and second embodiments are each an example, and therefore each term used in the first and second embodiments can be replaced with a term synonymous with the corresponding term or a term including functions synonymous with functions of the corresponding term.

The block diagrams used for descriptions of each embodiment are each illustrating functional components of the control apparatus 10, 20 into which the configuration of the control apparatus 10, 20 have been functionally divided. Each block illustrated in the block diagrams can be implemented by a combination of one or more hardware components and/or one or more software components. Because each block diagram illustrates the corresponding functional components, each block diagram can be understood as a disclosure of a corresponding method invention and/or a program invention for the corresponding method invention.

As to the sequential operations described in the embodiments, the order of any operations extracted from the sequential operations can be altered as long as there is not any limitation, such as the latter operation requires the results of the former operation. Similarly, as to the sequential steps of each flowchart described in the embodiments, the order of any steps extracted from the sequential steps can be altered as long as there is not any limitation, such as the latter step requires the results of the former step. Additionally, as to the sequential blocks understandable as a method in the embodiments, the order of any blocks extracted from the sequential blocks can be altered as long as there is not any limitation, such as the latter block requires the results of the functions of the former block.

The communication apparatuses disclosed in the present disclosure can be applied to vehicles. The communication apparatuses disclosed in the present disclosure can be applied as dedicated/general-purpose communication apparatuses to various uses except for vehicles unless they are limited to particular uses in the CLAIMS described later.

Each of the communication apparatuses disclosed in the present disclosure can be comprised of one or more semiconductor devices, one or more electronic circuits, one or more electronic modules, and/or one or more microcomputers. Each of the communication apparatuses disclosed in the present disclosure can be comprised of (i) a semi-finished product, such as an ECU or a system board, or (ii) a finished product, such as a server, a workstation, a personal computer (PC), a tablet, a smartphone, or a cellular phone. Each of the communication apparatuses disclosed in the present disclosure can be comprised of a device/system having communication functions, such as a vehicle navigation system.

The communication apparatuses disclosed in the present disclosure are estimated to be used for providing various services. That is, the communication apparatuses disclosed in the present disclosure are used to provide various services, the communication methods disclosed in the present disclosure are used to provide various services, and/or the communication programs disclosed in the present disclosure are used to provide various services.

The present disclosure can be implemented by one or more dedicated hardware devices that have the configurations and functions described in each embodiment. Additionally, the present disclosure can be implemented by one or more programs stored in one or more storage media, such as memories or hard disks. The present disclosure can be implemented by a combination of (i) one or more general-purpose hardware devices, which includes one or more dedicated/general-purpose CPUs and one or more memories, and (ii) a plurality of communication hardware systems including a plurality of communication networks; the one or more dedicated/general-purpose CPUs can execute the one or more programs.

Programs for the communication apparatuses disclosed in the present disclosure, which can be stored in one or more dedicated/general-purpose non-transitory storage media, can be provided to one or more dedicated/general-purpose hardware devices through (i) one or more storage media or (ii) one or more communication networks from one or more servers without storage media. The one or more dedicated/general-purpose non-transitory storage media can include hard disks, USB memories, compact disks, and Blu-ray Disks®. Upgrading the programs enables the latest functions to be provided.

The communication apparatuses disclosed in the present disclosure can serve as communication apparatuses that perform communications using a plurality of communication networks, and can be used to perform (i) communications among vehicles, such as traveling vehicles and/or parked vehicles, (ii) communications among ships, (iii) communications among aircrafts, or (iv) communications that use a large amount of data in fixed equipment.

The invention claimed is:

1. A hardware device including at least a memory and a CPU executing instructions stored in the memory, the hardware device being configured to provide:
    a transmission buffer configured to store fixed-length data packets in an intended order of complete receipt of the fixed-length data packets in a recipient device;
    N communication units provided for the corresponding respective N communication networks and configured to transmit at least one of the fixed-length data packets; and
    a communication controller configured to:
        retrieve, from the transmission buffer, the fixed-length data packets; and
        allocate the fixed-length data packets to a selected at least one of the N communication units,
    the communication controller comprising:
        a data transmission period acquiring unit configured to acquire, for each communication network, a data transmission period required from transmission of one of the fixed-length data packets through the corresponding network to complete receipt of the one of the fixed-length data packets by the recipient device;
        a transmission ready determiner configured to determine whether a transmission waiting state of each communication unit has changed to a transmission-ready state that enables data-packet transmission;

a buffer offset calculator configured to calculate, in response to determination that a k-th communication unit included in the N communication units is in the transmission-ready state, a buffer offset for the k-th communication unit in accordance with a total number of at least one of the fixed-length data packets that is (i) transmittable by at least one m-th communication unit in the N communication units except for the k-th communication unit and (ii) completely received by the recipient device within the data transmission period of the communication network corresponding to the k-th communication unit (m is each of variables 1 to N except for k); and a data packet allocator configured to:
  select, in a queue of the fixed-length data packets stored in the transmission buffer, one of the fixed-length data packets, a beginning of the selected data packet being located offset by the buffer offset relative to a beginning of the queue of the fixed-length data packets; and
  allocate the selected data packet to the k-th communication unit.

2. The hardware device according to claim 1, wherein:
the data transmission period acquiring unit is configured to calculate, for each communication network, a difference time defined from a data-packet transmission start time to a safe-receipt acknowledgement signal receipt time, the data-packet transmission start time being a time at which the communication unit for the corresponding communication network starting the one of the fixed-length data packets to the recipient device, the safe-receipt acknowledgement signal receipt time being a time at which the communication unit for the corresponding communication network receives a safe-receipt acknowledgement signal, the safe-receipt acknowledge signal having been transmitted from the recipient device to the communication unit for the corresponding communication network in response to receipt of the one of the fixed-length data packets; and
the data transmission period acquiring unit is configured to acquire, based on the difference time for each communication network, the data transmission period for the corresponding communication network.

3. The hardware device according to claim 2, wherein:
the data transmission period acquiring unit is configured to acquire, for each communication network, the data transmission period based on a latest value of the safe-receipt acknowledgement signal receipt time.

4. The hardware device according to claim 1, wherein:
each of the N communication units is configured to:
  establish a window size that specifies a range of one or more of the fixed-length data packets transmittable without receiving a safe-receipt acknowledgement signal; and
  execute window control that sequentially transmit one or more of the fixed-length data packets within the window size without waiting for the safe-receipt acknowledgement signal; and
the buffer offset calculator is configured to calculate the buffer offset for the k-th communication unit based on the window size of the k-th communication unit.

5. The hardware device according to claim 1, wherein:
the communication controller is configured to:
  determine whether an order of complete receipt of the fixed-length data packets by the recipient device agrees with an order of storage of the fixed-length data packets in the transmission buffer; and
  instruct the data transmission period acquiring unit to acquire, again, the data transmission period for each communication network in response to determination that the order of complete receipt of the fixed-length data packets by the recipient device does not agree with the order of storage of the fixed-length data packets in the transmission buffer.

6. The hardware device according to claim 1, wherein the hardware device is installed in a mobile object.

7. A hardware device including at least a memory and a CPU executing instructions stored in the memory, the hardware device being configured to provide:

a transmission buffer configured to store fixed-length data packets in an intended order of complete receipt of the fixed-length data packets in a recipient device;

N communication units provided for the corresponding respective N communication networks and configured to transmit at least one of the fixed-length data packets; and a communication controller configured to:
  retrieve, from the transmission buffer, the fixed-length data packets; and
  allocate the fixed-length data packets to a selected at least one of the N communication units,
the communication controller comprising:
  a data transmission period acquiring unit configured to acquire, for each communication network, a data transmission period required from transmission of one of the fixed-length data packets through the corresponding network to complete receipt of the one of the fixed-length data packets by the recipient device;
  a sort unit configured to sort a list of the communication units in ascending order of communication-rate of the communication networks respectively corresponding to the N communication units, so that the list of the N communication units is sorted from the first communication unit to the N-th communication unit in ascending order of their communication rates;
  a transmission ready determiner configured to determine whether a transmission waiting state of each communication unit has changed to a transmission-ready state that enables data-packet transmission;
  a buffer offset calculator configured to calculate, in response to determination that a k-th communication unit included in the N communication units is in the transmission-ready state, a buffer offset for the k-th communication unit in accordance with a total number of at least one of the fixed-length data packets that is (i) transmittable by at least one m-th communication unit in the N communication units and (ii) completely received by the recipient device within the data transmission period of the communication network corresponding to the k-th communication unit (m is each of variables 1 to k−1), the data transmission period of the at least one m-th communication unit being smaller than that of the k-th communication unit; and
  a data packet allocator configured to:
    select, in a queue of the fixed-length data packets stored in the transmission buffer, one of the fixed-length data packets, a beginning of the selected data packet being located offset by the buffer offset relative to a beginning of the queue of the fixed-length data packets; and allocate the selected data packet to the k-th communication unit.

8. The hardware device according to claim 7, wherein:
the data transmission period acquiring unit is configured to calculate, for each communication network, a difference time defined from a data-packet transmission start time to a safe-receipt acknowledgement signal receipt time, the data-packet transmission start time being a time at which the communication unit for the corresponding communication network starting the one of the fixed-length data packets to the recipient device, the safe-receipt acknowledgement signal receipt time being a time at which the communication unit for the corresponding communication network receives a safe-receipt acknowledgement signal, the safe-receipt acknowledge signal having been transmitted from the recipient device to the communication unit for the corresponding communication network in response to receipt of the one of the fixed-length data packets; and
the data transmission period acquiring unit is configured to acquire, based on the difference time for each communication network, the data transmission period for the corresponding communication network.

9. The hardware device according to claim 8, wherein:
the data transmission period acquiring unit is configured to acquire, for each communication network, the data transmission period based on a latest value of the safe-receipt acknowledgement signal receipt time.

10. The hardware device according to claim 7, wherein:
each of the N communication units is configured to:
  establish a window size that specifies a range of one or more of the fixed-length data packets transmittable without receiving a safe-receipt acknowledgement signal; and
  execute window control that sequentially transmit one or more of the fixed-length data packets within the window size without waiting for the safe-receipt acknowledgement signal; and
the buffer offset calculator is configured to calculate the buffer offset for the k-th communication unit based on the window size of the k-th communication unit.

11. The hardware device according to claim 7, wherein:
the communication controller is configured to:
  determine whether an order of complete receipt of the fixed-length data packets by the recipient device agrees with an order of storage of the fixed-length data packets in the transmission buffer; and
  instruct the data transmission period acquiring unit to acquire, again, the data transmission period for each communication network in response to determination that the order of complete receipt of the fixed-length data packets by the recipient device does not agree with the order of storage of the fixed-length data packets in the transmission buffer.

12. The hardware device according to claim 7, wherein the hardware device is installed in a mobile object.

13. A communication method executable by a communication apparatus comprising a CPU and memory to provide transmitting, to a recipient device, fixed-length data packets with use of N communication networks (N is an integer more than or equal to 2), the communication method comprising:
storing the fixed-length data packets in an intended order of complete receipt of the fixed-length data packets in the recipient device;
acquiring, for each communication network, a data transmission period required from transmission of one of the fixed-length data packets through the corresponding network to complete receipt of the one of the fixed-length data packets by the recipient device;
determining whether a transmission waiting state of each communication unit has changed to a transmission-ready state that enables data-packet transmission;
calculating, in response to determination that a k-th communication unit included in the N communication units is in the transmission-ready state, a buffer offset for the k-th communication unit in accordance with a total number of at least one of the fixed-length data packets that is (i) transmittable by at least one m-th communication unit in the N communication units except for the k-th communication unit and (ii) completely received by the recipient device within the data transmission period of the communication network corresponding to the k-th communication unit (m is each of variables 1 to N except for k);
selecting, in a queue of the fixed-length data packets stored in the transmission buffer, one of the fixed-length data packets, a beginning of the selected data packet being located offset by the buffer offset relative to a beginning of the queue of the fixed-length data packets;
allocating the selected data packet to the k-th communication unit; and
transmitting, by the k-th communication unit, the allocated data packet to the recipient device.

14. A non-transitory storage media storing a communication program executable by a communication apparatus comprising a CPU and memory to provide for transmitting, to a recipient device, fixed-length data packets with use of N communication networks (N is an integer more than or equal to 2), the communication program causing the communication apparatus to:
store the fixed-length data packets in an intended order of complete receipt of the fixed-length data packets in the recipient device;
acquire, for each communication network, a data transmission period required from transmission of one of the fixed-length data packets through the corresponding network to complete receipt of the one of the fixed-length data packets by the recipient device;
determine whether a transmission waiting state of each communication unit has changed to a transmission-ready state that enables data-packet transmission;
calculate, in response to determination that a k-th communication unit included in the N communication units is in the transmission-ready state, a buffer offset for the k-th communication unit in accordance with a total number of at least one of the fixed-length data packets that is (i) transmittable by at least one m-th communication unit in the N communication units except for the k-th communication unit and (ii) completely received by the recipient device within the data transmission period of the communication network corresponding to the k-th communication unit (m is each of variables 1 to N except for k);
select, in a queue of the fixed-length data packets stored in the transmission buffer, one of the fixed-length data packets, a beginning of the selected data packet being located offset by the buffer offset relative to a beginning of the queue of the fixed-length data packets;
allocate the selected data packet to the k-th communication unit; and
instruct the k-th communication unit to transmit the allocated data packet to the recipient device.

15. An integrated circuit configured to provide:
a transmission buffer configured to store fixed-length data packets in an intended order of complete receipt of the fixed-length data packets in a recipient device;
N communication units provided for the corresponding respective N communication networks and configured to transmit at least one of the fixed-length data packets; and
a communication controller configured to:
  retrieve, from the transmission buffer, the fixed-length data packets; and
  allocate the fixed-length data packets to a selected at least one of the N communication units,
the communication controller comprising:
  a data transmission period acquiring unit configured to acquire, for each communication network, a data transmission period required from transmission of one of the fixed-length data packets through the corresponding network to complete receipt of the one of the fixed-length data packets by the recipient device;
  a transmission ready determiner configured to determine whether a transmission waiting state of each communication unit has changed to a transmission-ready state that enables data-packet transmission;
  a buffer offset calculator configured to calculate, in response to determination that a k-th communication unit included in the N communication units is in the transmission-ready state, a buffer offset for the k-th communication unit in accordance with a total number of at least one of the fixed-length data packets that is (i) transmittable by at least one m-th communication unit in the N communication units except for the k-th communication unit and (ii) completely received by the recipient device within the data transmission period of the communication network corresponding to the k-th communication unit (m is each of variables 1 to N except for k); and
  a data packet allocator configured to:
    select, in a queue of the fixed-length data packets stored in the transmission buffer, one of the fixed-length data packets, a beginning of the selected data packet being located offset by the buffer offset relative to a beginning of the queue of the fixed-length data packets; and
    allocate the selected data packet to the k-th communication unit.

16. An integrated circuit configured to provide:
a transmission buffer configured to store fixed-length data packets in an intended order of complete receipt of the fixed-length data packets in a recipient device;
N communication units provided for the corresponding respective N communication networks and configured to transmit at least one of the fixed-length data packets; and
a communication controller configured to:
  retrieve, from the transmission buffer, the fixed-length data packets; and
  allocate the fixed-length data packets to a selected at least one of the N communication units,
the communication controller comprising:
  a data transmission period acquiring unit configured to acquire, for each communication network, a data transmission period required from transmission of one of the fixed-length data packets through the corresponding network to complete receipt of the one of the fixed-length data packets by the recipient device;
  a sort unit configured to sort a list of the communication units in ascending order of communication-rate of the communication networks respectively corresponding to the N communication units, so that the list of the N communication units is sorted from the first communication unit to the N-th communication unit in ascending order of their communication rates;
  a transmission ready determiner configured to determine whether a transmission waiting state of each communication unit has changed to a transmission-ready state that enables data-packet transmission;
  a buffer offset calculator configured to calculate, in response to determination that a k-th communication unit included in the N communication units is in the transmission-ready state, a buffer offset for the k-th communication unit in accordance with a total number of at least one of the fixed-length data packets that is (i) transmittable by at least one m-th communication unit in the N communication units and (ii) completely received by the recipient device within the data transmission period of the communication network corresponding to the k-th communication unit (m is each of variables 1 to k−1), the data transmission period of the at least one m-th communication unit being smaller than that of the k-th communication unit; and
  a data packet allocator configured to:
    select, in a queue of the fixed-length data packets stored in the transmission buffer, one of the fixed-length data packets, a beginning of the selected data packet being located offset by the buffer offset relative to a beginning of the queue of the fixed-length data packets; and
    allocate the selected data packet to the k-th communication unit.

* * * * *